US008743830B2

(12) United States Patent  (10) Patent No.: US 8,743,830 B2
Mizukoshi                  (45) Date of Patent:     Jun. 3, 2014

(54) MOBILE COMMUNICATION SYSTEM, GATEWAY DEVICE, BASE STATION DEVICE, CONTROL METHOD OF GATEWAY DEVICE, AND COMPUTER-READABLE MEDIUM

(75) Inventor: Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/500,296

(22) PCT Filed: Aug. 3, 2010

(86) PCT No.: PCT/JP2010/004874
§ 371 (c)(1),
(2), (4) Date: Apr. 4, 2012

(87) PCT Pub. No.: WO2011/045882
PCT Pub. Date: Apr. 21, 2011

(65) Prior Publication Data
US 2012/0196600 A1   Aug. 2, 2012

(30) Foreign Application Priority Data
Oct. 13, 2009 (JP) ................................ 2009-236228

(51) Int. Cl.
H04W 4/00 (2009.01)

(52) U.S. Cl.
USPC ...................... 370/331; 455/432.1; 455/435.1; 455/436

(58) Field of Classification Search
None
See application file for complete search history.

(56) References Cited

U.S. PATENT DOCUMENTS

| 7,075,910 | B2 * | 7/2006 | Chen et al. .................... 370/331 |
| 7,649,866 | B2 * | 1/2010 | Chari et al. .................... 370/331 |
| 2002/0191560 | A1 * | 12/2002 | Chen et al. .................... 370/331 |
| 2007/0140264 | A1 * | 6/2007 | Chen et al. ................. 370/395.54 |
| 2007/0223494 | A1 * | 9/2007 | Hyyrynen et al. ....... 370/395.54 |
| 2008/0261563 | A1 | 10/2008 | Drevon et al. |
| 2008/0267153 | A1 | 10/2008 | Mukherjee et al. |
| 2008/0293419 | A1 | 11/2008 | Somasundaram et al. |
| 2009/0092133 | A1 * | 4/2009 | Mok et al. ..................... 370/389 |
| 2010/0062768 | A1 | 3/2010 | Lindqvist et al. |
| 2010/0260146 | A1 * | 10/2010 | Lu .................................. 370/331 |
| 2010/0272063 | A1 * | 10/2010 | Kato et al. ..................... 370/331 |
| 2011/0122841 | A1 | 5/2011 | Aoyagi et al. |

FOREIGN PATENT DOCUMENTS

| WO | WO 2007104324 A1 * | 9/2007 | .............. H04L 12/56 |
| WO | WO2008/108717 A1 | 9/2008 | |
| WO | WO2008/125657 A1 | 10/2008 | |
| WO | WO2008/134281 A2 | 11/2008 | |
| WO | WO2008/137376 A2 | 11/2008 | |
| WO | WO 2009070061 A1 * | 6/2009 | .............. H04W 8/08 |
| WO | WO2009/110565 A1 | 9/2009 | |

OTHER PUBLICATIONS

International Search Report in PCT/JP2010/004874 dated Aug. 31, 2010 (English Translation Thereof).
3GPP TS 22.220, V9.1.1. (Jun. 2009),Technical Specification, $3^{rd}$ Generation Partnership Project; Techincal Specification Group Services and System Aspects; Service requirements for Home NodeBs and Home eNodeBs (Release 9).
3GPP contribution, R2-094053 "Introduction of local breakout from HNB for Gn/Gp SGSN", pp. 49-50, May 2009, [online], 3GPP, [Searched on Aug. 14, 2009], Internet <URL: http://www.3gpp.org/ftp/tsg_sa/WG2_Arch/TSGS2_73_Tallinn/Docs/S2-094053.zip>.
3GPP contribution, R2-093803 "Local IP access principles for single PDN connection solutions", May 2009, [online], 3GPP, [Searched on Aug. 14, 2009], Internet <URL: http://www.3gpp.org/ftp/tsg_sa/WG2_Arch/TSGS2_73_Tallinn/Docs/S2-093803.zip>.

* cited by examiner

Primary Examiner — Magdi Elhag
(74) Attorney, Agent, or Firm — McGinn I. P. Law Group, PLLC

(57) ABSTRACT

A H(e)NB (1A) includes a radio IF (10) that performs radio communication with a UE (2), a LAN-IF (11) connectable to a LAN (34), and an address management unit (15) capable of storing a MAC address of the UE (2) different from a MAC address of the H(e)NB (1A) assigned to the LAN-IF (11). The H(e)NB (1A) is configured to transmit, to the LAN (34), a MAC frame having the MAC address of the UE (2) as a source address in response to receiving transmission data to the LAN (34) from the UE (2).

35 Claims, 23 Drawing Sheets

MOBILE COMMUNICATION SYSTEM, GATEWAY DEVICE, BASE STATION DEVICE, CONTROL METHOD OF GATEWAY DEVICE, AND COMPUTER-READABLE MEDIUM

TECHNICAL FIELD

The present invention relates to a mobile communication system and, particularly, to a mobile communication system in which data traffic from a mobile terminal to an external network can be offloaded to the external network without being sent to a mobile core network.

BACKGROUND ART

In 3GPP (3rd Generation Partnership Project), 3GPP2 (3rd Generation Partnership Project 2), WiMAX (Worldwide Interoperability for Microwave Access) forum and the like, the standardization of a small radio base station that can be installed in user's home, office and the like is being developed. It is assumed that the small radio base station is installed in home, small office and the like by a user who owns the small radio base station, and connected to a core NW using a broadband line such as an ADSL (Asymmetric Digital Subscriber Line) or optical fiber line. Such a small radio base station is generally called a femto base station, a femtocell base station, or a home base station. Further, the size (cover area) of a cell formed by a small radio base station is significantly smaller than that of a macro cell used hitherto. Therefore, a cell formed by a small radio base station is called a femtocell, a home cell and the like. The 3GPP defines such a small radio base station as Home Node B (HNB) and Home evolved Node B (HeNB) and promotes the standardization. HNB is a small radio base station for UTRAN (UMTS (Universal Mobile Telecommunications System) Terrestrial Radio Access Network), and HeNB is a small radio base station for LTE (Long Term Evolution)/EUTRAN (Evolved UTRAN).

In this specification, such a small radio base station is called "home base station", undo cell formed by a home base station is called "femtocell". Note that home base stations for UTRAN and E-UTRAN under study by the 3GPP are called HNB and HeNB, respectively, as are referred to in the 3GPP, or they are collectively called H(e)NB.

When a large number of home base stations are connected to a mobile core network (which is hereinafter referred to as a mobile core NW), and communications of a large number of mobile terminals are performed through the home base stations, the load on the core NW increases. Particularly, it is anticipated that traffic for Internet access by the mobile terminals causes an increase in the load on the core NW. In view of this. the requirements for home base stations defined by the 3GPP include support of "Local IP Access (LIPA) function" by the H(e)NB (see Non Patent Literature 1). LIPA is a function of directly offloading, into user's home network at the home base station, the mobile terminal's traffic to/from the Internet and the user's home network without transferring it to the core NW. LIPA is also called "local breakout".

FIG. 1 shows a specific example of LIPA in a 3GPP mobile communication system (UMTS (Universal Mobile Telecommunications System)/EPS (Evolved Packet System)). In the example of FIG. 1, a H(e)NB 91 is connected to a subnet 34 of a home NW 3. A subnet means a broadcast domain which is a range that a Layer-2 broadcast reaches. The home NW 3 is connected to an IP (Internet Protocol) access network 4 through a broadband router (BBR) 30.

A H(e)NB-GW 50 is placed at the boundary between a mobile core NW 5 and the IP access NW 4, and relays user data and control data between a data transfer entity and a control entity (SGSN/S-GW 51, GGSN/P-GW 52 etc.) located within the mobile core NW 5 and the H(e)NB 91. When a public network such as the Internet is used as the IP access NW 4, a secure path 41 such as an IPsec tunnel is set up between the H(e)NB-GW 50 and the H(e)NB 91.

When a mobile terminal (UE) 2 connecting to the H(e)NB 91 accesses an external network 6, the H(e)NB 91 transfers transmission data of the mobile terminal 2 to the mobile core NW 5. On the other hand, when the mobile terminal 2 accesses a host 31 located within the home NW or a host 42 within the IP access NW 4, the H(e)NB 91 branches IP packets to the subnet 34 by the LIPA function. For example, the H(e)NB 91 monitors a destination address added to a transmission IP packet of the mobile terminal 2 and, when the destination address corresponds to the host 31, the H(e)NB 91 generates a MAC (Media Access Control) frame addressed to the host 31 and sends it to the subnet 34, without transmitting the transmission packet to a bearer connected to the core NW.

The full names of the abbreviated terms in FIG. 1 are as follows.

SGSN: Serving GPRS (General Packet Radio Service) Support Node
S-GW: Serving Gateway
GGSN: Gateway GPRS Support Node
P-GW: PDN (Packet Data Network)
H(e)NB-GW: H(e)NB Gateway
UE: User Equipment In Non Patent Literatures 2 and 3, techniques to implement LIPA are proposed. Non Patent Literature 2 proposes a technique that incorporates anchor function of IP communication into the home base station. Non Patent Literature 3 proposes a technique that incorporates NAT (Network Address Translation) function into the home base station.

CITATION LIST

Non Patent Literature

[NPL 1] 3GPP TS22.220 v9.1.1 (2009-06), "Service requirements for Home NodeBs and Home eNodeBs (Release 9)"

[NPL 2] 3GPP contribution, R2-094053 "Introduction of local breakout from HNB for Gn/Gp SGSN", pp. 49-50, May 2009, [online], 3GPP, [Searched on Aug. 14, 2009], Internet <URL: http://www.3gpp.org/ftp/tsg_sa/WG2_Arch/TSGS2__73_Tallinn/Docs/S2-094053.zip>

[NPL 3] 3GPP contribution, R2-093803 "Local IP access principles for single PDN connection solutions", May 2009, [online], 3GPP, [Searched on Aug. 14, 2009], Internet <URL: http://www.3gpp.org/ftp/tsg_sa/WG2_Arch/TSGS2__73_Tallinn/Docs/S2-093803.zip>

SUMMARY OF INVENTION

Technical Problem

In the case where a home base station is placed in a large scale network such as a corporate network, the assumed use case is that a plurality of home base stations are connected to the same LAN as shown in FIG. 2. In the example of FIG. 2, two home base stations H(e)NBs 91A and 91B are connected to the subnet 34 of the home NW 3. In the example of FIG. 2, consider the case where a mobile terminal moves from one home base station (H(e)NB 91A) to another home base station (H(e)NB 91B) on the same LAN.

In this case, the technique proposed in Non Patent Literature 2 has a problem that the LIPA path becomes too long as shown by the arrow R1 in FIG. 2. Specifically, when the mobile terminal 2 that has moved to the H(e)NB 91B accesses the host 31 on the subnet 34, the LIPA path becomes a long path that goes through communication paths 41A and 41B with the H(e)NB-GW 50. The reason is that, because the anchor function of IP communication resides in the H(e)NB 91A from which the mobile terminal 2 has moved, all communications need to go though the H(e)NB 91A serving as an anchor.

On the other hand, in the example of FIG. 2, the technique proposed in Non Patent Literature 3 has a problem that a communication with the host 31 on the subnet 34 cannot be performed continuously before and after movement between the H(e)NBs as shown by the arrow R2. The reason is that, due to using the NAT functions of the H(e)NBs 91A and 91B for LIPA, a destination IP address that can reach the mobile terminal 2 from the host 31 changes before and after movement between the H(e)NBs.

For example, when the mobile terminal 2 is connecting to the H(e)NB 91A, source IP addresses of IP packets from the mobile terminal 2 to the subnet 34 and destination IP addresses of IP packets from the subnet 34 to the mobile terminal 2 designate the IP address of the H(e)NB 91A. However, when the mobile terminal 2 has moved and become connected to the H(e)NB 91B, a reachable IP address of the mobile terminal 2 from the subnet 34 changes into the IP address of the H(e)NB 91B. Thus, when the mobile terminal 2 has moved to the H(e)NB 91B, even if the host 31 transmits IP packets each having the IP address of the H(e)NB 91A as the destination IP address, the IP packets do not reach the mobile terminal 2. Due to this change in IP address, it is difficult to continue a communication between the host 31 on the subnet 34 and the mobile terminal 2 before and after movement between the H(e)NBs.

Further, not only a change in IP address, a change in MAC address causes a significant problem. This is because the reachability of IP packets within the subnet 34 is achieved by the Layer-2. Upon a change in IP address and MAC address, the downtime of the communication service is increased, since it takes time until the change is reflected on ARP tables and Layer-2 forwarding tables held by devices in the subnet 34.

Situations having the above-described problems are not limited to the case where the mobile terminal moves between H(e)NBs that support the LIPA function. For example, in the case of a large-scale user such as a company, it is assumed that plural H(e)NB-GWs are arranged in a home NW (corporate NW) and the H(e)NB-GWs support the LIPA function. In this case, problems similar to those described above occur when a mobile terminal moves between the H(e)NB-GWs.

Further, the similar problems may occur in the case where a mobile terminal moves to a macro cell from a femtocell under the H(e)NB or H(e)NB-GW supporting the LIPA function. This is because the gateway for the mobile terminal to accesses the home NW changes from the H(e)NB or H(e)NB-GW to P-GW/GGSN located in the mobile core NW.

To address the above problems, an illustrative object of the invention is to provide a mobile communication system, a gateway device, a base station device, a control method of a gateway device, and a program capable of suppressing extension of a communication path for a mobile terminal to access an external network and also contributing to the improvement of continuity of a communication by suppressing changes in Layer-2 and Layer-3 addresses for accessing the external network, when the mobile terminal has moved across gateways that relay Layer-3 packets between the external network and the mobile communication system.

The external network is PDN including a home NW in the case of the 3GPP. The mobile communication system is UMTS or EPS in the case of the 3GPP. Layer-3 packets are IP packets, for example. The gateway to relay Layer-3 packets is H(e)NB supporting LIPA, H(e)NB-GW supporting LIPA, or P-GW in the case of the 3GPP.

Solution to Problem

In a first aspect of the invention, a mobile communication system includes a radio access network that performs radio communication with a mobile terminal, a mobile core network connected to the radio access network, and a gateway device. The gateway device is located at a boundary between the radio access network and an external network or at a boundary between the mobile core network and an external network, and has an interface connectable to the external network. Further, the gateway device is configured to store the mobile terminal's Layer-2 address different from the gateway device's Layer-2 address that is assigned to the interface. The gateway device is also configured to transmit, to the external data network through the interface, a transmission Layer-2 data frame having the mobile terminal's Layer-2 address as a source address in response to receiving transmission data to the external data network from the mobile terminal.

In a second aspect of the invention, a gateway device is located at a boundary between a radio access network that performs radio communication with a mobile terminal and an external network or at a boundary between a mobile core network connected to the radio access network and an external network. The gateway device includes an interface connectable to the external network, an address management unit, and a communication control unit. The address management unit is capable of storing a mobile terminal's Layer-2 address different from the gateway device's Layer-2 address that is assigned to the interface. The communication control unit is configured to transmit, to the external data network through the interface, a transmission Layer-2 data frame having the mobile terminal's Layer-2 address as a source address in response to receiving transmission data to the external data network from the mobile terminal.

In a third aspect of the invention, a base station device is configured to connect to a mobile core network via a local area network (LAN) and relay data between the LAN and a mobile terminal and between the mobile core network and the mobile terminal. The base station device includes a LAN interface, a radio interface, a core network communication control unit, a local access communication control unit, and an address management unit. The LAN interface is capable of sending a Layer-2 data frame to the LAN. The radio interface performs radio communication with the mobile terminal. The core network communication control unit controls data transmission and reception with the mobile core network via the LAN interface. The local access communication control unit controls communication between the mobile terminal and the LAN not via the mobile core network. The address management unit is capable of storing the mobile terminal's Layer-2 address different from the base station device's Layer-2 address that is assigned to the LAN interface. Further, the local access communication control unit is configured to transmit. to the LAN through the LAN interface, a transmission Layer-2 data frame having the mobile terminal's Layer-2 address as a source address in response to receiving transmission data to the LAN from the mobile terminal.

In a fourth aspect of the invention, a control method of a gateway device is provided. The gateway device is located at a boundary between a radio access network that performs radio communication with a mobile terminal and an external network or at a boundary between a mobile core network connected to the radio access network and an external network, and includes an interface connectable to the external network. The method according to this aspect includes:
(a) acquiring the mobile terminal's Layer-2 address different from the gateway device's Layer-2 address that is assigned to the first interface, and
(b) transmitting, to the external data network through the interface, a transmission Layer-2 data frame having the mobile terminal's Layer-2 address as a source address in response to receiving transmission data to the external data network from the mobile terminal.

In a fifth aspect of the invention, a program causing a computer to perform control related to a gateway device is provided. The gateway device is located at a boundary between a radio access network that performs radio communication with a mobile terminal and an external network or at a boundary between a mobile core network connected to the radio access network and an external network, and includes a first interface connectable to the external network and a second interface capable of communicating with the mobile terminal. The control performed by the computer that executes the program according to this aspect includes:
(a) acquiring the mobile terminal's Layer-2 address different from the gateway device's Layer-2 address that is assigned to the interface, and
(b) controlling the first interface to transmit, to the external data network, a transmission Layer-2 data frame having the mobile terminal's Layer-2 address as a source address in response to receiving transmission data to the external data network from the mobile terminal.

Advantageous Effects of Invention

According to each of the illustrative aspects of the invention described above, it is possible to suppress extension of a communication path for a mobile terminal to access an external network and also to contribute to the improvement of continuity of a communication by suppressing changes in Layer-2 and Layer-3 addresses for accessing the external network, when the mobile terminal has moved across gateways that relay Layer-3 packets between the external network and the mobile communication system.

DESCRIPTION OF EMBODIMENTS

Figure 1:
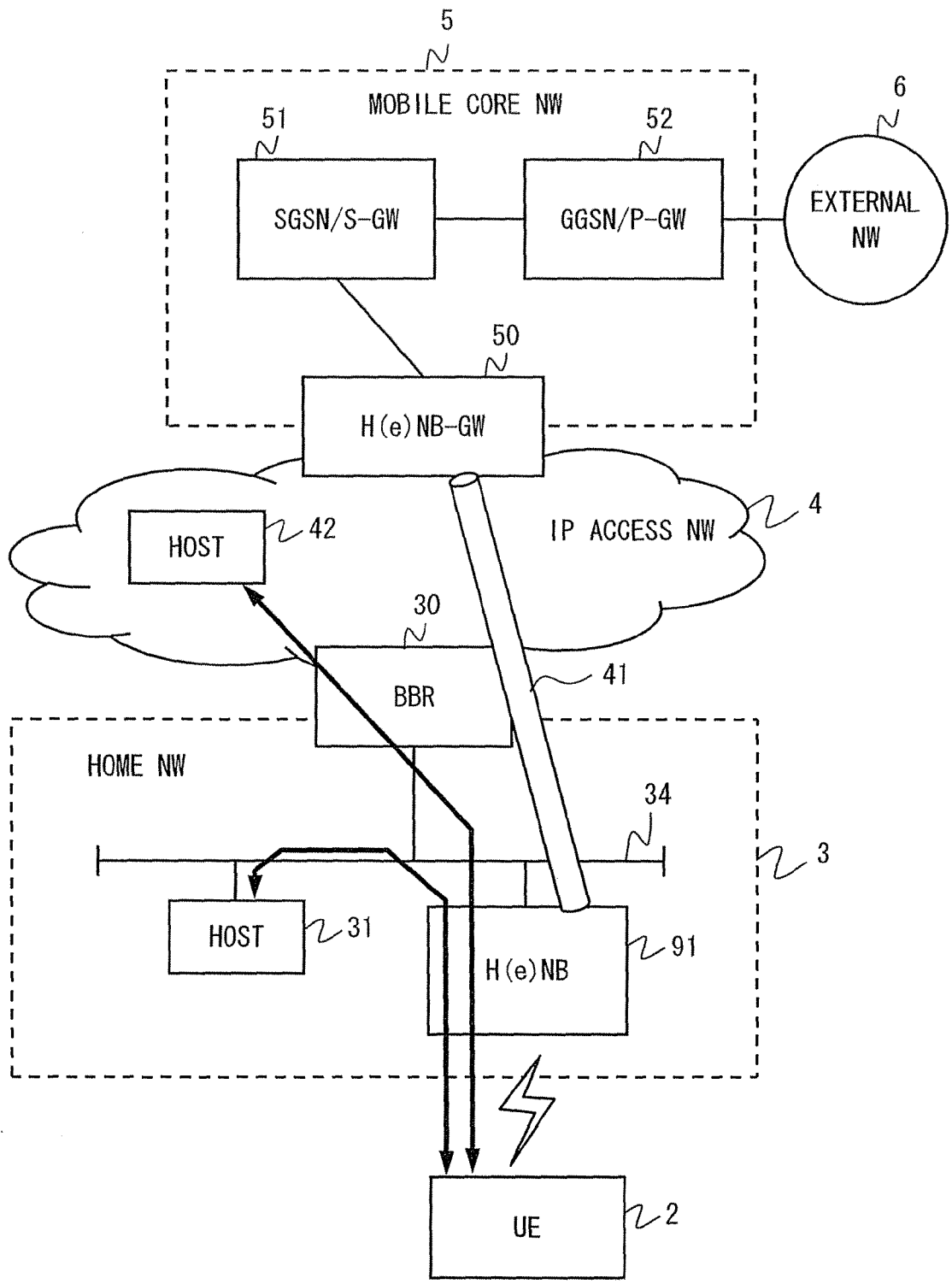
FIG. 1 is a diagram showing a configuration example of a 3GPP mobile communication system including a home base station (H(e)NB) and a communication path of LIPA (Local IP Access).
Figure 2:
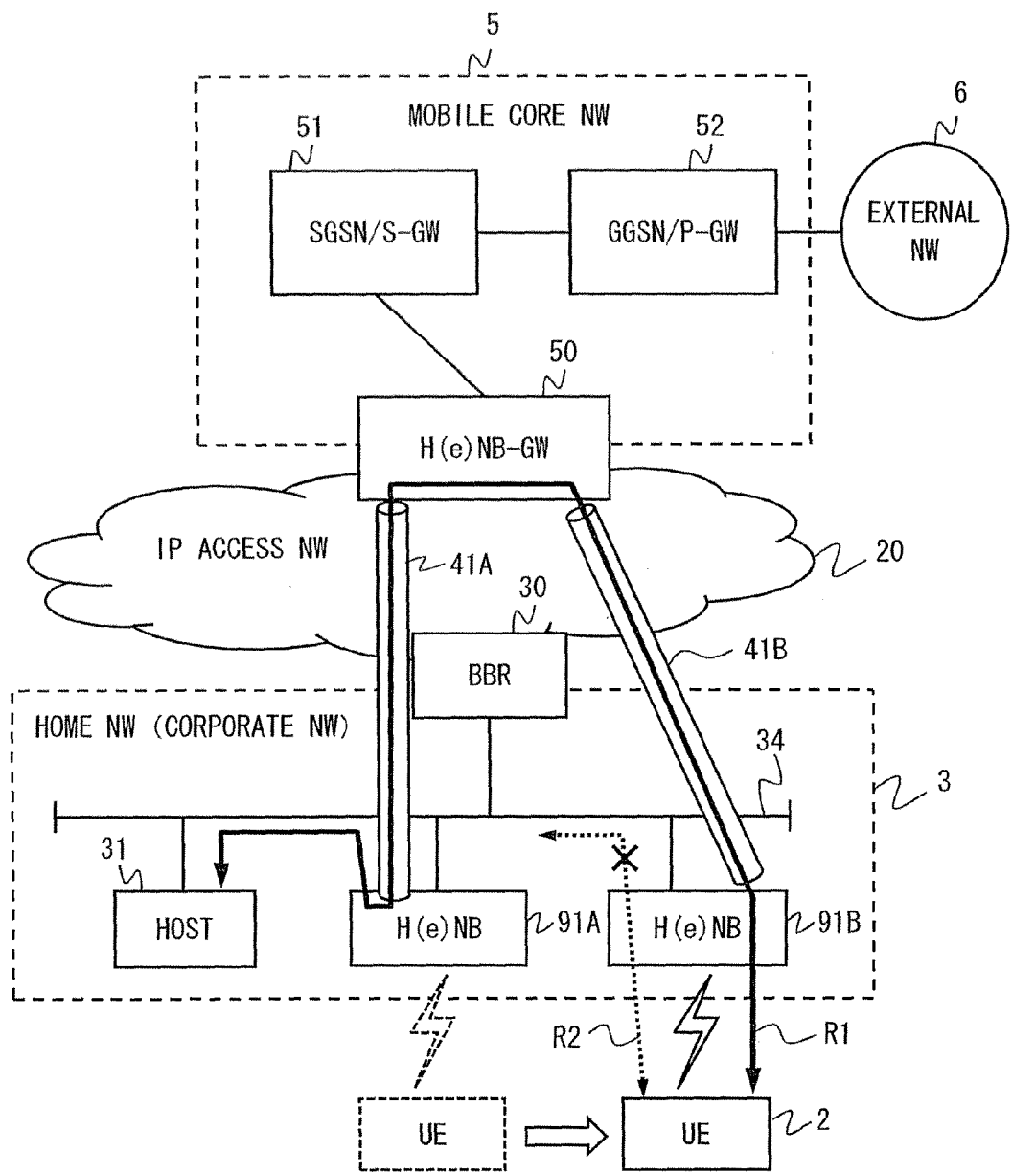
FIG. 2 is a network configuration diagram to describe a problem of a technique to implement LIPA propsed in the 3GPP.

Illustrative embodiments of the present invention will be described hereinafter in detail with reference to the drawings. In the drawings, the identical reference symbols denote identical elements and the redundant explanation thereof is omitted as appropriate to clarify the explanation.

First Illustrative Embodiment

In this illustrative embodiment, a mobile communication system that includes a home base station supporting LIPA is described. Further, in this illustrative embodiment, a case where the mobile communication system is 3GPP UTRAN/EUTRAN is described by way of illustration. Hereinafter, the outline of the illustrative embodiment, particularly about the functions and operations of home base stations (H(e)NBs) 1A and 1B, is schematically described first, and specific configuration examples are described after that.

Figure 4:
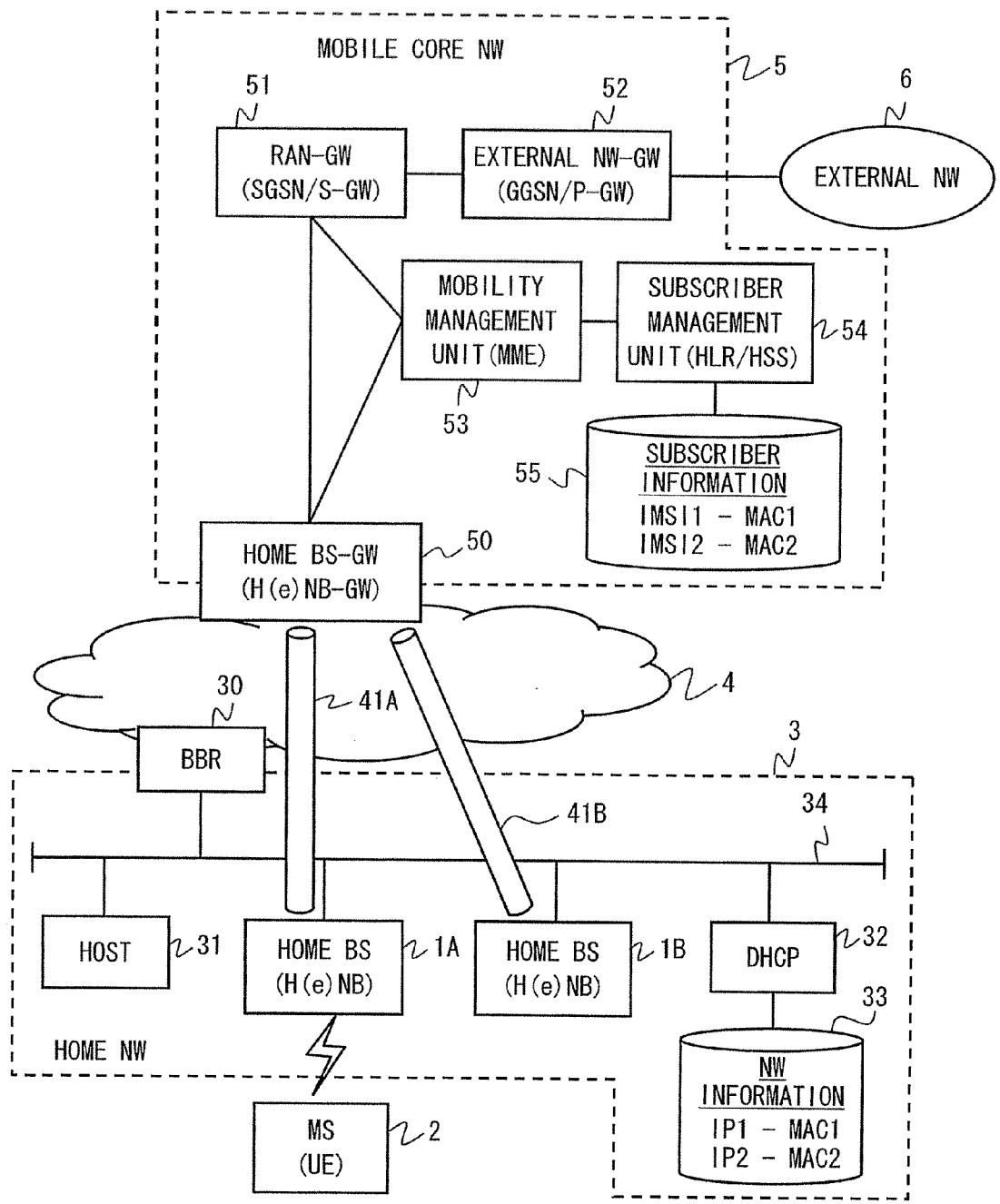
FIG. 4 is a diagram showing a configuration example of a mobile communication system according to a first illustrative embodiment of the invention.

FIG. 4 shows a configuration example of a mobile communication system according to this illustrative embodiment. The home base stations (H(e)NBs) 1A and 1B have a wired LAN interface in compliance with the IEEE802.3 series standard or the like or a wireless LAN interface in compliance with the IEEE802.11 series standard or the like, and are connected to a home NW 3 such as a corporate LAN. The H(e)NBs 1A and 1B are capable of communicating with a home base station GW (H(e)NB-GW) 50 through a BBR 30 and an IP access NW 4. Communication paths 41A and 41B are logical communication paths such as IPsec tunnels, and are set up between the H(e)NBs 1A and 1B and the H(e)NB-GW. Further, the H(e)NBs 1A and 1B belong to a radio access network and have a UTRAN/EUTRAN radio interface for performing radio communication with a mobile terminal (UE) 2.

Further, the H(e)NBs 1A and 1B according to this illustrative embodiment support LIPA. Specifically, the H(e)NBs 1A and 1B offload IP traffic of the mobile terminal (UE) 2 to access a host 31 in a corporate NW or the Internet into the home NW 3 without transferring it to the mobile core NW 5.

To handle movement of the UE 2 between the H(e)NBs, the H(e)NBs 1A and 1B are capable of storing MAC (Media Access Control) addresses that are assigned to respective UEs 2. The MAC addresses assigned to respective UEs 2 is different from the MAC addresses of the H(e)NBs 1A and 1B that are set to LAN interfaces included in the H(e)NBs 1A and 1B, and associated with respective UEs 2. Note that a MAC address is a Layer-2 address that is used in a wired LAN in compliance with the IEEE802.3 series standard or the like or a wireless LAN in compliance with the IEEE802.11 series standard or the like. In FIG. 4, the subnet 34 uses MAC addresses as the Layer-2 addresses.

To perform LIPA communication related to the UE 2, with use of a corresponding MAC address of the UE 2, the H(e)NBs 1A and 1B acquire an IP address associated with the MAC address. Further, the H(e)NBs 1A and 1B transmit and receive MAC frames each of which an IP packet related to the LIPA communication of the UE 2 is contained in the payload. A corresponding IP address of the UE 2 is set as the source address of an IP packet that is transmitted from the H(e)NBs 1A and 1B to the host 31. Further, a corresponding MAC address of the UE 2 is set as the source address of a MAC frame addressed to the host 31 of which this IP packet is contained in the payload.

There are a large variety of methods for the H(e)NBs 1A and 1B to acquire the MAC address of each mobile terminal. For example, the MAC address of the UE 2 may be supplied from the mobile core NW 5 to the H(e)NB 1 (1A or 1B) during an authentication process, a location registration process, or a bearer setting process, in response to an attach request from the UE 2. In this case, the mobile core NW 5 may manage the MAC address of the UE 2 as one of subscriber information, together with a subscriber identifier (IMSI: International Mobile Subscriber Identity) or the like.

Further, the H(e)NBs 1A and 1B may acquire the MAC address from the UE 2, for example. In this case, the MAC address may be stored together with IMSI, UE's unique identification number (IMEI: International Mobile Equipment Identity) or the like in an IC (Integrated Circuit) card inserted into the UE 2.

Further, the MAC address of the UE 2 may be recorded in advance in association with IMSI, IMEI or the like into memory in the H(e)NBs 1A and 1B, for example. As described in Non Patent Literature 1, a typical H(e)NB supports the use case of providing a service only to a group of predetermined subscribers or UEs called CSG (Closed Subscriber Group). Thus, MAC addresses for the respective UEs may set at the same time as setting the CSG list to the H(e)NB.

There are also a large variety of methods to acquire the IP address of the UE 2 corresponding to the MAC address of the UE 2. In other words, various existing IP address assignment techniques may be applied as long as the IP address of each UE 2 can be generated in association with the MAC address that is uniquely issued for each UE 2. Specifically, stateful setting that makes inquiry to an external address server and stateless setting that generates an IP address autonomously on the basis of the MAC address of the UE 2 are both applicable for the acquisition of the IP address of the UE 2.

For example, an IP address assignment protocol such as DHCP (Dynamic Host Configuration Protocol) may be used for the acquisition of the IP address of the UE 2. In this case, the H(e)NBs 1A and 1B may transmit an IP address assignment request (for example, a DHCP request) including the MAC address of the UE 2 to an address server (for example, a DHCP server) and receive assignment of the IP address for the UE 2 from the address server. The address server such as a DHCP server manages MAC addresses and IP addresses in association with one another and sets the expiration date (lease period) of the IP address. In order to maintain the state where the same IP address is assigned to the MAC address of the UE 2, the H(e)NBs 1A and 1B may make a request to extend the lease period (for example, a unicast DHCP request) before the lease period is over. Such an operation is generally employed in the address assignment protocol such as DHCP.

Further, Stateless Address Autoconfiguration of IPv6 (Internet Protocol version 6) or the like may be used for the acquisition of the IP address of the UE 2. In this case, the IP address of the UE 2 can be uniquely generated from the MAC address of the UE 2 and the IP address architecture (i.e. network prefix) of the subnet 34. Thus, the H(e)NBs 1A and 1B can autonomously generate the IP address of the UE 2 that is uniquely specified by the MAC address of the UE 2 and the IP address architecture of the subnet 34.

As described above, in this illustrative embodiment, when the UE 2 has moved from the H(e)NB 1A to the H(e)NB 1B, the H(e)NB 1B acquires the MAC address of the UE 2 which is the same as the one acquired by the H(e)NB 1A. Further, the H(e)NB 1B acquires the IP address which is uniquely determined from the MAC address of the UE 2. Then, the H(e)NB 1B performs LIPA communication with the host 31 using the acquired MAC address and the IP address of the UE 2. As a result, even when the UE 2 that is performing LIPA communication with the host 31 has moved from the H(e)NB 1A to the H(e)NB 1B, the H(e)NB 1B to which the UE 2 has moved can continue the LIPA communication using the same MAC address of the UE 2 as the one used by the H(e)NB 1A from which the UE 2 has moved. Further, because the H(e)NB 1A from which the UE 2 has moved does not need to serve as an anchor, extension of a communication path can be avoided.

Hereinafter, configuration examples and operations of the mobile communication system according to this illustrative embodiment are described in detail with reference to FIGS. 4 to 9. In the example of FIG. 4, the MAC address of the UE 2 is included in subscriber information 55 that is managed by a subscriber management unit 54 located in the mobile core NW 5. Further, the H(e)NBs 1A and 1B acquire the IP address that corresponds to the MAC address of the UE 2 from a DHCP server 32 located in the home NW 3.

The subscriber management unit 54 is equivalent of HLR (Home Location Register) and HSS (Home Subscriber Server) in the 3GPP mobile communication system (UMTS and EPS). The HLR/HSS 54 manages subscriber information. The subscriber information includes basic information used for authentication of the UE 2 and its user and for control of various services. For example, the subscriber information includes IMSI, IMEI, contract APN (Access Point Name), static IPv4 address/IPv6 prefix and the like.

A mobility management unit 53 connects a control interface between a SGSN/S-GW 51, a GGSN/P-GW 52 and the H(e)NBs 1A and 1B, and performs the UE 2 mobility management and session management (bearer management). The mobility management unit 53 is equivalent of MME (Mobility Management Entity) in the 3GPP mobile communication system (UMTS and EPS).

The SGSN/S-GW 51 connects a transfer plane U-plane) of user data between RAN (UTRAN/EUTRAN) including home base stations (H(e)NBs) 1A and 1B and the mobile core NW 5. The SGSN/S-GW 51 performs routing and transferring user packets between the RAN and the mobile core NW 5.

The GGSN/P-GW 52 is a point of connection between the mobile core NW 5 and the external NW 6. The GGSN/P-GW 52 performs routing and transferring of user packets between the mobile core NW 5 and the external NW 6.

Note that the elements shown in FIG. 4, particularly the elements within the mobile core NW 5, do not indicate physical device units and merely indicate functional entities. For example, the SGSN/S-GW 51 and the GGSN/P-GW 52 may be implemented as separate router devices or may be integrated as a single router device.

Figure 5:
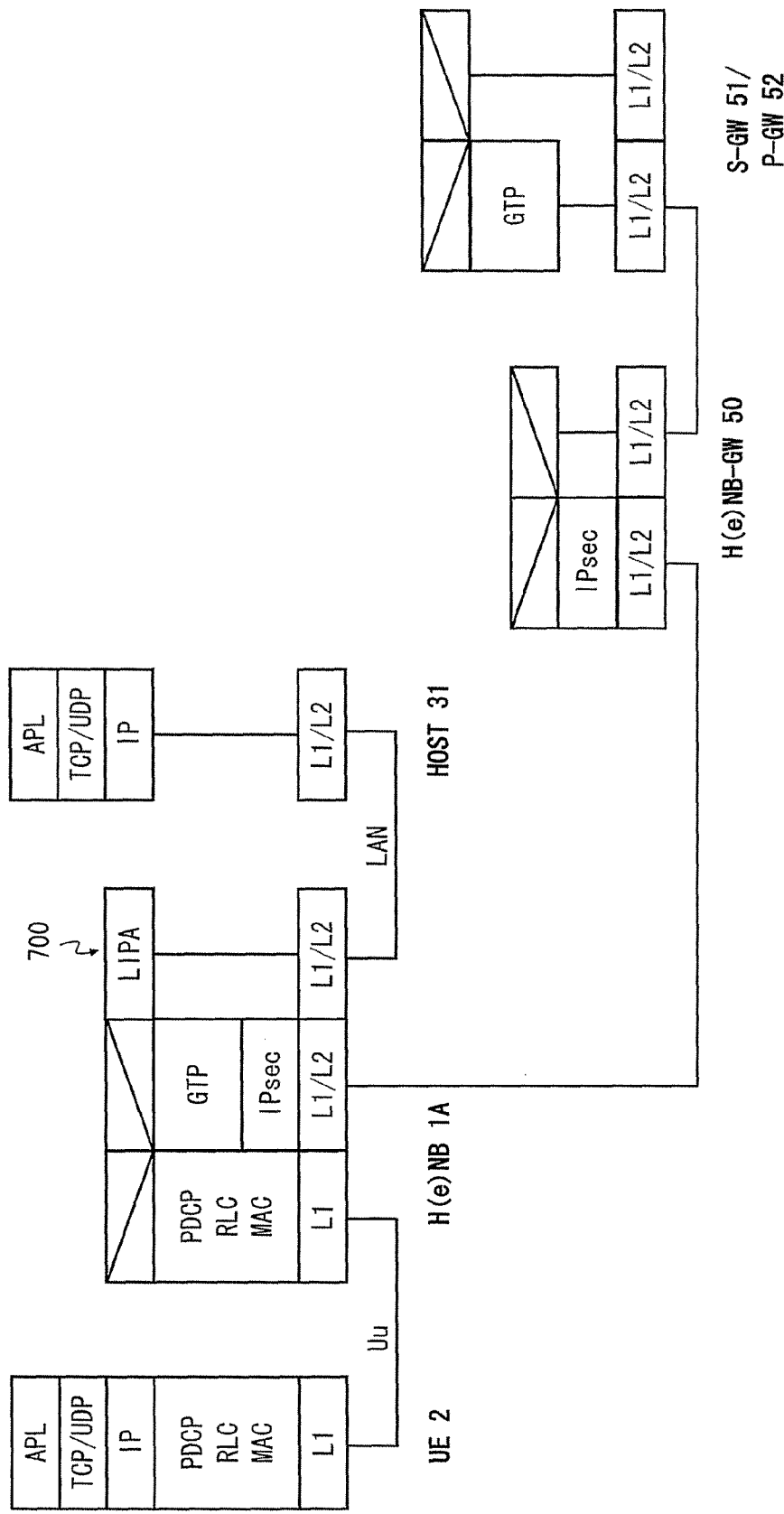
FIG. 5 is a protocol stack diagram of the mobile communication system shown in FIG. 4.

FIG. 5 shows a protocol stack of the mobile communication system according to this illustrative embodiment. LIPA function 700 in the H(e)NB 1A relays communications between the UE 2 and the host 31.

Figure 6:
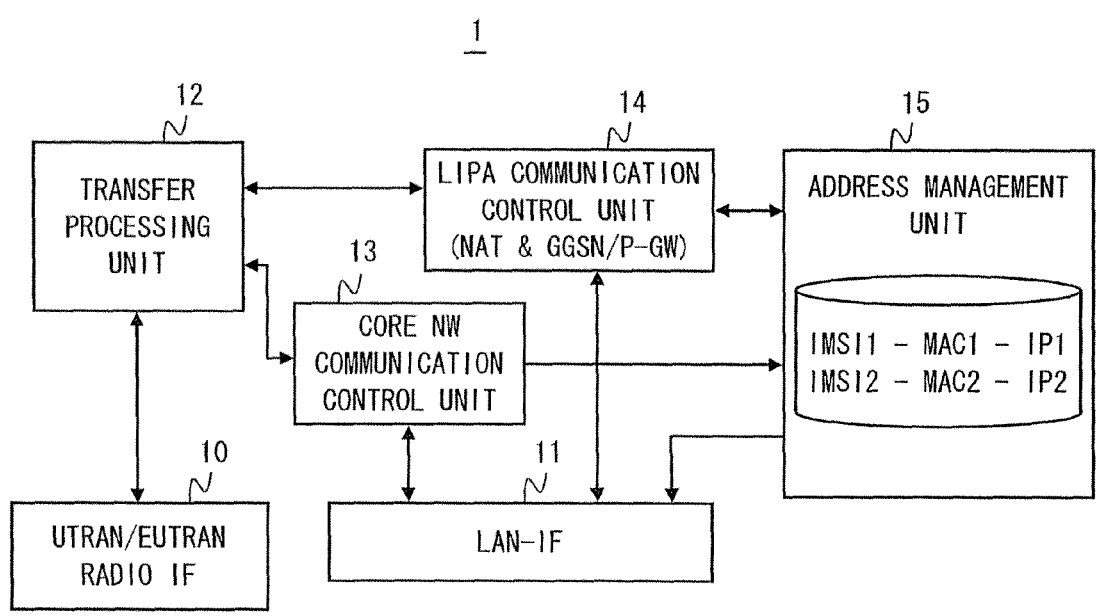
FIG. 6 is a block diagram showing a configuration example of a home base station (H(e)NB) shown in FIG. 4.

FIG. 6 is a block diagram showing a configuration example of the H(e)NBs 1A and 1B. In FIG. 6, a UTRAN/EUTRAN radio interface (radio IF) 10 is a communication interface for performing radio communication with the UE 2. A LAN interface (LAN-IF) 11 is a wired LAN or wireless LAN interface for connection with the home NW 3.

A transfer processing unit 12 monitors IP packet flow that is received by the radio IF 10 and separates IP packets to be transferred to the SGSN/S-GW 51 of the mobile core NW 5 and IP packets to be offloaded to the home NW 3 for LIPA. The IP packets to be transferred to the SGSN/S-GW 51 are supplied to a core NW communication control unit 13, and the IP packets to be offloaded to the home NW 3 are supplied to a LIPA communication control unit 14.

The core NW communication control unit 13 performs setting of a communication path 41 (41A or 41B) with the H(e)NB-GW 50, setting of a bearer with the mobile core NW 5, and transferring of control packets and user packets. Further, the core NW communication control unit 13 transmits IMSI of the UE 2 to the mobile core NW 5 to request authentication and location update for attach of the UE 2. Then, the core NW communication control unit 13 receives the MAC address (for example, MAC1) of the UE 2 that is managed in association with the IMSI (for example, IMSI1) of the UE 2 in the subscriber information 55. The MAC address of the UE 2 received by the core NW communication control unit 13 is supplied to an address management unit 15.

The address management unit 15 stores the MAC address and the IP address of the UE 2 in association with each other. Note that the address management unit 15 is capable of storing the MAC address and the IP address of each of a plurality of UEs 2. The address management unit 15 generates a DHCP request and sends it out from the LAN-IF 11 in order to acquire an IP address corresponding to the MAC address of the UE 2 acquired by the core NW communication control unit 13. The address management unit 15 receives a DHCP response that includes the IP address of the UE 2 from the DHCP server 32 located in the subnet 34.

Because the LIPA communication control unit 14 is a point of connection with the home NW 3, which is one of external networks, the LIPA communication control unit 14 has GGSN/P-GW function that relays user packets between the home NW 3 and the mobile communication system (UMTS/EPS). Further, the LIPA communication control unit 14 has NAT (Network Address Translation) function. The NAT operation performed by the LIPA communication control unit 14 includes conversion of the IP address of the UE 2 that is used in H(e)NB-UE connection in the mobile communication system and the IP address (i.e. IP address consistent with the address architecture of the home NW 3) of the UE 2 that is acquired from the DHCP server 32 by the address management unit 15. Further, the LIPA communication control unit 14 controls the LAN-IF 10 so that the MAC address of the UE 2 is set as the source address of the MAC frame of which the transmission IP packet of the UE 2 is contained in the payload.

FIG. 6 shows the configuration example in which the LIPA communication control unit 14 performs NAT. However, the LIPA communication control unit 14 may be configured not to perform NAT. Specifically, an IP address assigned by the DHCP server 32 may be used as the IP address associated with a bearer termination point on the UE 2 side when activating or when updating the settings of GPRS/EPS bearer between the LIPA communication control unit 14 having the GGSN/P-GW function and the UE 2. The IP address of the UE 2 that is used in the mobile communication system for the IP packet of LIPA communication and the IP address of the UE 2 that is used in the home NW 3 thereby match, so that NAT in the LIPA communication control unit 14 is not needed.

The processing including the acquisition of the MAC address and the IP address that is performed by the LIPA communication control unit 14 and the address management unit 15 may be implemented using a semiconductor processing device such as ASIC, DSP or the like. Further, such processing may be implemented by ASIC or DSP common to at least part of processing (for example, baseband signal processing) executed by the radio IF 10 or the LAN-IF 11.

Further, the processing performed by the core NW communication control unit 13, the LIPA communication control unit 14 and the address management unit 15 may be implemented by causing a computer such as a microprocessor to execute one or a plurality of programs. The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a wireless communication line.

Next, a specific example of operation that the UE 2 makes an initial connection (initial attach) to the mobile communication system and performs data transmission/reception by LIPA with the host 31 is described by reference to FIG. 7.

<Procedural Step (1)>

The UE 2 connects to the H(e)NB 1A and starts a connection authentication procedure with the mobile core NW 5. The IMSI (IMSI1) of the UE 2 is used for authentication.

<Procedural Step (2)>

Authentication of the UE 2 is carried out between the mobile core NW 5 and the H(e)NB 1A. The HLR/HSS 54 authenticates the UE 2 using the IMSI1. When authentication is successful, the HLR/HSS 54 transmits the MAC address (MAC1) that is associated with the IMSI1 in the subscriber information 55 to the H(e)NB 1A.

<Procedural Step (3)>

The core NW communication control unit 13 of the H(e)NB 1A notifies the address management unit 15 of the MAC address (MAC1) that corresponds to the UE 2. The address management unit 15 records the MAC address (MAC1) in association with the IMSI (IMSI1) as management information of the UE 2.

<Procedural Step (4)>

The address management unit 15 of the H(e)NB 1A transmits a DHCP request through the LAN-IF 11 in order to acquire an IP address that corresponds to the MAC address (MAC1) of the UE 2. The DHCP server 32 transmits a DHCP response that includes an IP address (IP1) corresponding to the MAC address (MAC1). The address management unit 15 records the IP address (IP1) included in the DHCP response as management information of the UE 2.

<Procedural Step (5)>

The UE 2 and the host 31 start communication. In the case of performing packet transmission from the UE 2 to the host 31, an IP packet and a MAC frame consistent with the home NW 3 are generated by the LIPA function of the H(e)NB 1A. Specifically, the IP address (IP1) of the UE 2 is designated as a source IP address, and the MAC address (MAC1) of the UE 2 is used as a source MAC address. On the other hand, in the case of performing packet transmission from the host 31 to the UE 2, the host 31 generates an IP packet for which IP1 is set as a destination IP address and generates a MAC frame for which MAC1 is set as a destination MAC address. The LAN-IF 11 of the H(e)NB 1A receives the MAC frame sent from the host 31. Then, the LIPA communication control unit 14 converts the destination address assigned to the IP packet from the host 31 into the IP address of the UE 2 within the mobile communication system and then transmits the IP packet to the UE 2 through the radio IF 10.

Note that, in the above procedural step (4), the address management unit 15 may send a broadcast packet or a multicast packet of which the IP address of the UE 2 acquired from the DHCP server 32 is contained in the payload and the MAC address of the UE 2 is designated as the source address to the subnet 34. A forwarding table stored in Layer-2 switches (not shown) or the like connected to the subnet 34 is thereby updated instantaneously, and it is thus possible to reduce the service downtime upon movement of the UE 2.

For example, when the IP address of the UE 2 is IPv4 address, the address management unit 15 may transmit ARP (Address Resolution Protocol) reply addressed to a broadcast address. Further, when the IP address of the UE 2 is IPv6 address, the address management unit 15 may transmit Neighbor Advertisement packet addressed to a multicast address.

Figure 7:
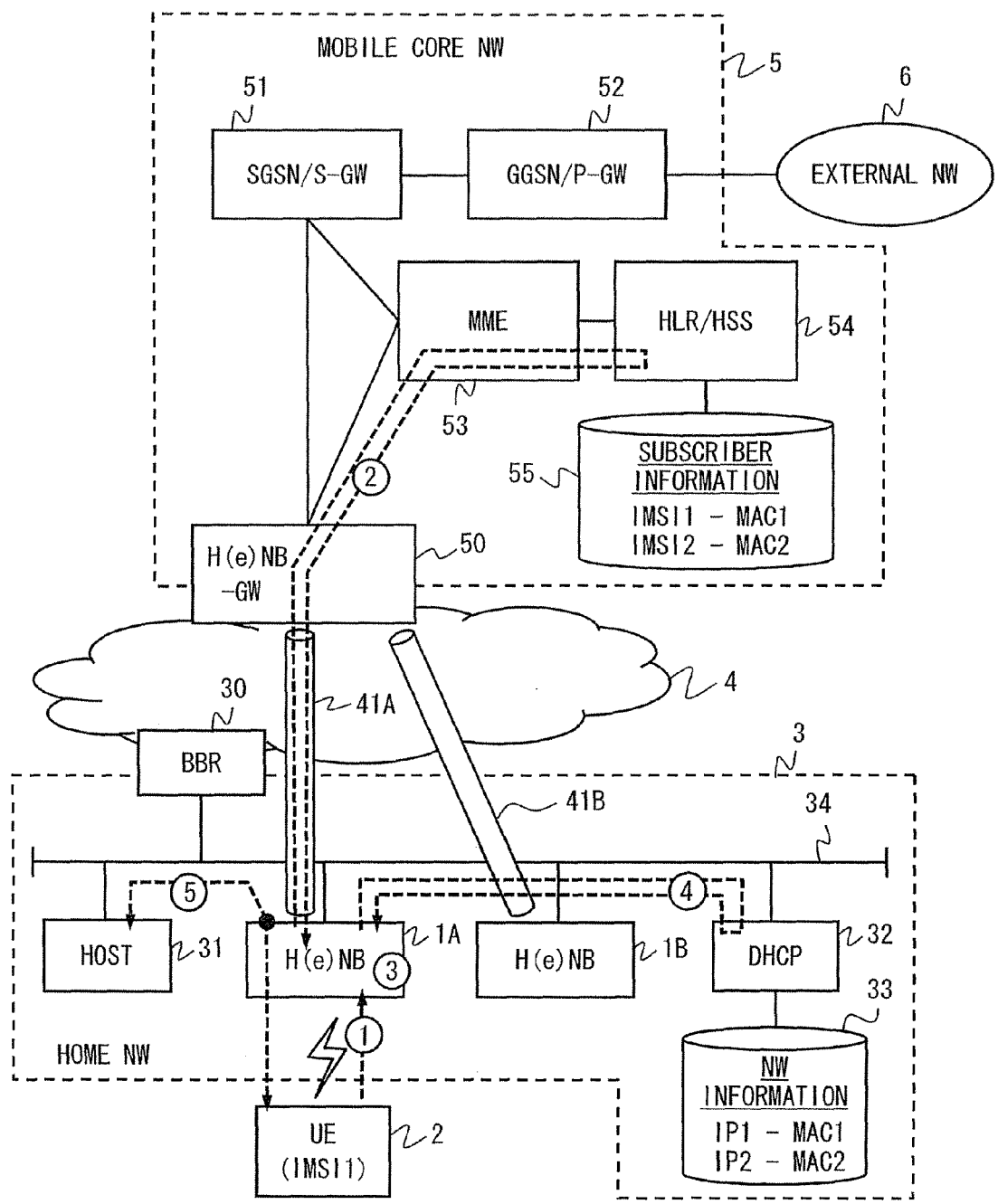
FIG. 7 is a network configuration diagram showing a mobile terminal attach process in the mobile communication system shown in FIG. 4.
Figure 8:
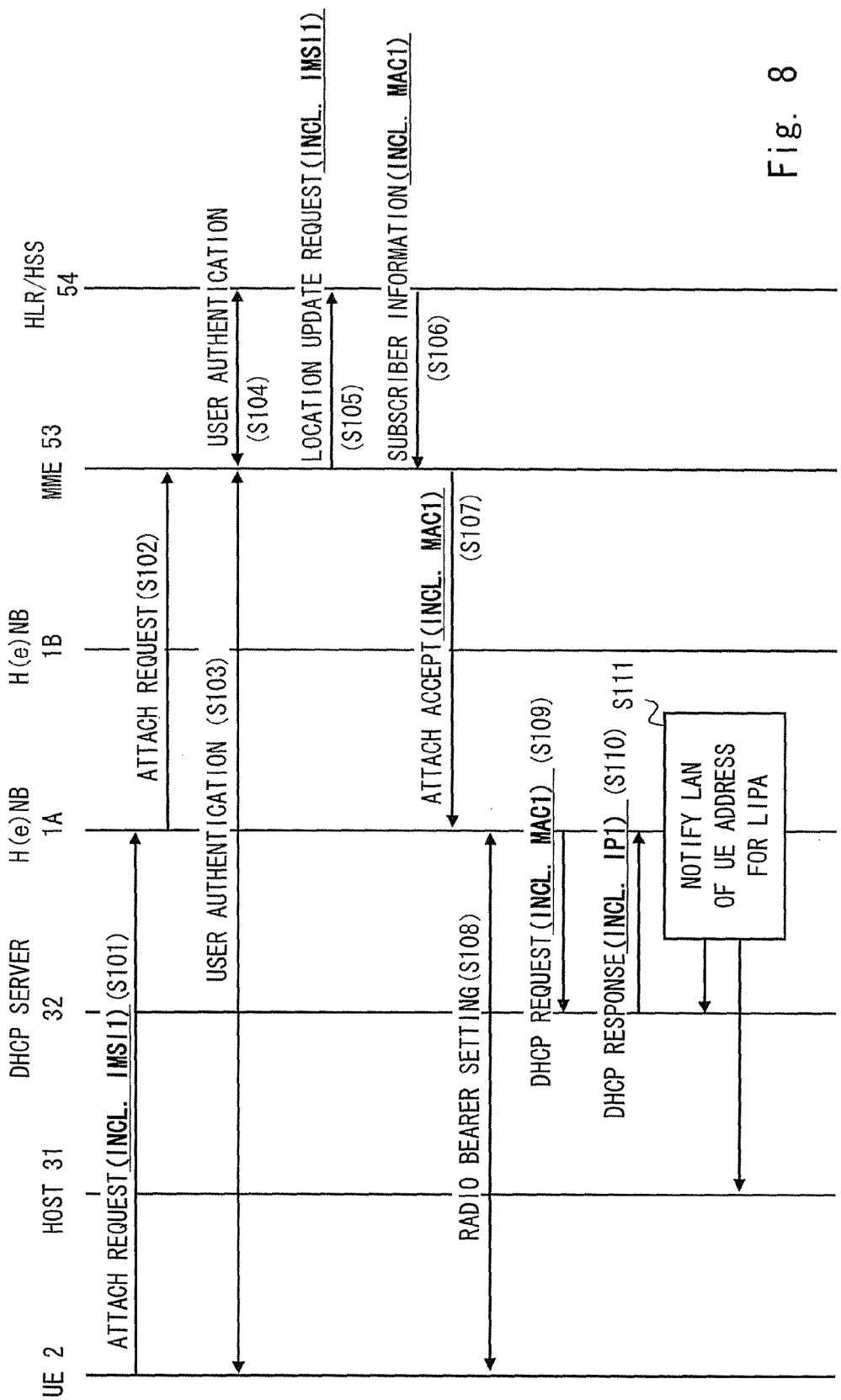
FIG. 8 is a sequence chart showing a specific example of the mobile terminal attach process in the mobile communication system shown in FIG. 4.

FIG. 8 is a sequence chart showing a specific example of the attach procedure of the UE 2 described using FIG. 7. FIG. 8 is an example in the case of EPS, which is, the case where the H(e)NB 1A is HeNB. In Step S101, the UE 2 transmits an attach request to the HeNB 1A. The attach request includes IMSI (IMSI1) of the UE 2 or a temporarily assigned identifier (GUTI (Globally Unique Temporary Identity), TMSI (Temporary Mobile Subscriber Identity) or the like). In Step S102, the HeNB 1A transfers the attach request to the MME 53. In Steps S103 and S104, user authentication is performed among the UE 2, the MME 53 and the HSS 54 at the initiative of the MME 53.

In Step S105, the MME 53 transmits a location update request to the HSS 54. The location update request includes IMSI (IMSI1) for identifying the UE 2. The HSS 54 performs location update of the UE 2 and transmits information about the UE 2 stored in the subscriber information 55 to the MME 53 (Step S106). The subscriber information about the UE 2 to be transmitted to the MME 53 includes a MAC address (MAC1) of the UE 2 associated with the IMSI1.

The MME 53 selects appropriate P-GW and S-GW by reference to the subscriber information of the UE 2 received from the HSS 54 and performs default bearer setting with the selected P-GW and S-GW. After that, the MME 53 transmits an attach accept (context setting request) message to the HeNB 1A (Step S102). The attach accept message includes the MAC address (MAC1) of the UE 2 in addition to existing information such as IP address information of APN, GUTI and default bearer identifier.

Receiving the attach accept (context setting request) message, the HeNB 1A performs radio bearer setting with the UE 2 (Step S108). In Step S109, the HeNB 1A transmits a DHCP request message to the home NW 3 (subnet 34) to ask for assignment of an IP address that corresponds to the MAC address (MAC1) of the UE 2. The DHCP request is received by the DHCP server 32. In Step S110, the HeNB 1A receives a DHCP response including an IP address (IP1) of the UE 2 from the DHCP server 32 (Step S110). Finally, in Step S111, the HeNB 1A broadcasts the MAC address (MAC1) of the UE 2 for LIPA to the LAN (to the subnet 34). The broadcasting may be made by transmitting an ARP reply or a Neighbor Advertisement packet to the subnet 34 as described earlier.

Figure 9:
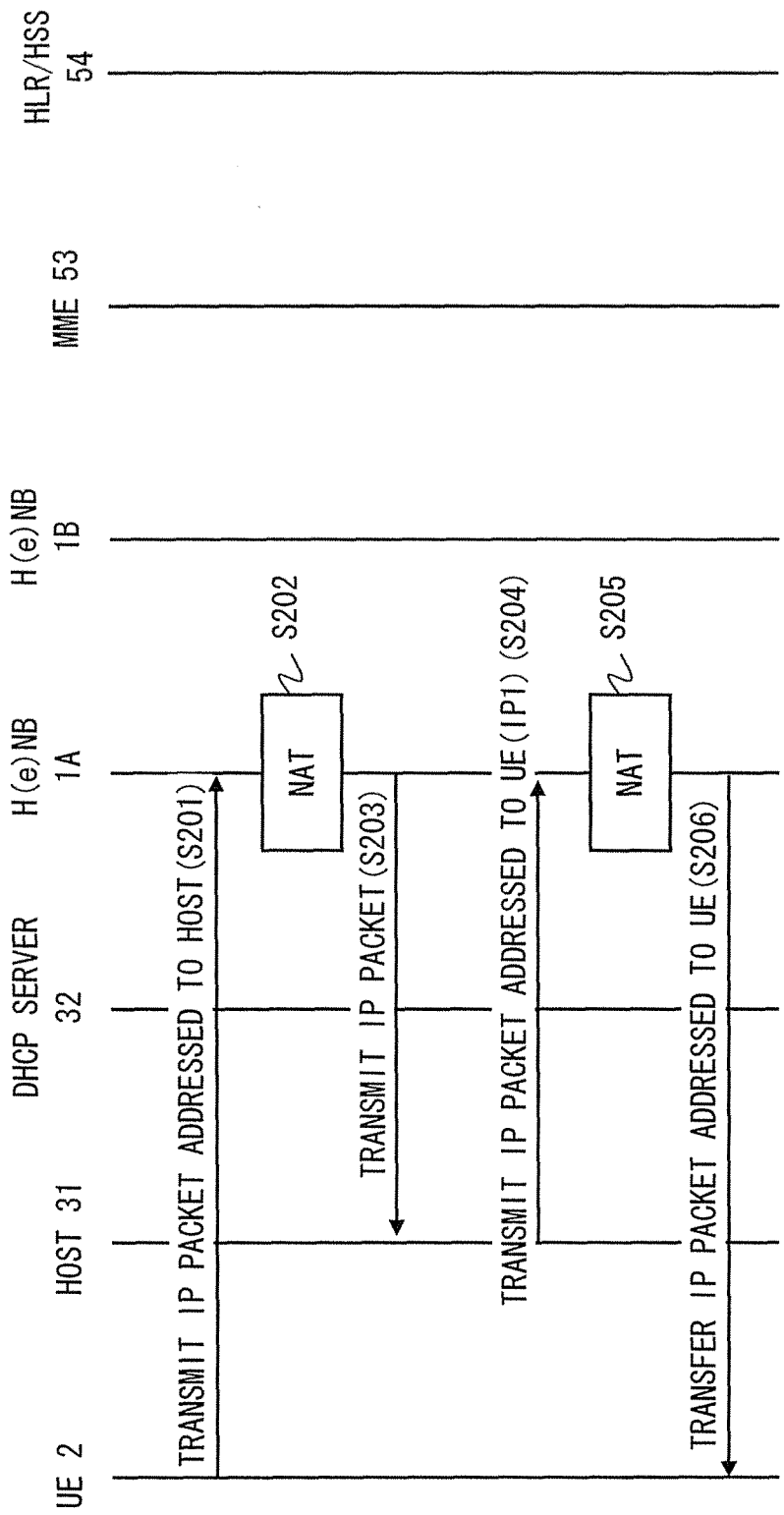
FIG. 9 is a sequence chart related to LIPA operation in the home base station (H(e)NB) shown in FIG. 4.

FIG. 9 is a sequence chart showing a specific example of the LIPA communication procedure of the UE 2 described using FIG. 7. FIG. 9 is an example in the case of EPS, which is, the case where the H(e)NB 1A is HeNB. In Step S201, the UE 2 transmits an IP packet addressed to the host 31 on the radio bearer established between the HeNB 1A and the UE 2.

In Step S202, the HeNB 1A converts the source IP address of the IP packet addressed to the host 31 received from the UE 2 into the address (IP1) obtained from the DHCP server 32. In Step S203, the HeNB 1A transmits, to the subnet 34, a MAC frame of which the IP packet addressed to the host 31 after the source address has been converted is contained in the payload and the MAC address (MAC1) of the UE 2 is set as the source MAC address.

In Step S204, the host 31 transmits a MAC frame of which the IP packet addressed to the UE 2 is contained in the payload. At this time, the IP address (IP1) of the UE 2 is set as the destination IP address of the IP packet addressed to the UE 2. Further, the MAC address (MAC1) of the UE 2 is set as the destination MAC address of the MAC frame transmitted from the host 31.

In Step S205, the HeNB 1A receives the MAC frame addressed to the UE 2 transmitted from the host 31 and extracts the IP packet addressed to the UE 2. Then, the HeNB 1A converts the destination IP address of the IP packet addressed to the UE 2 into the IP address of the UE 2 in EPS (the IP address of the UE 2 associated with a termination point of the radio bearer). In Step S206, the HeNB 1A transmits the IP packet after the destination IP address has been converted to the radio bearer established between the HeNB 1A and the UE 2. Note that, as described earlier, in the case of using the IP address (IP1) that is assigned from the DHCP server 32 as the IP address associated with a termination point on the UE 2 side of a GPRS/EPS bearer between the HeNB 1A and the UE 2, NAT in Steps S202 and S205 is not needed.

Figure 10:
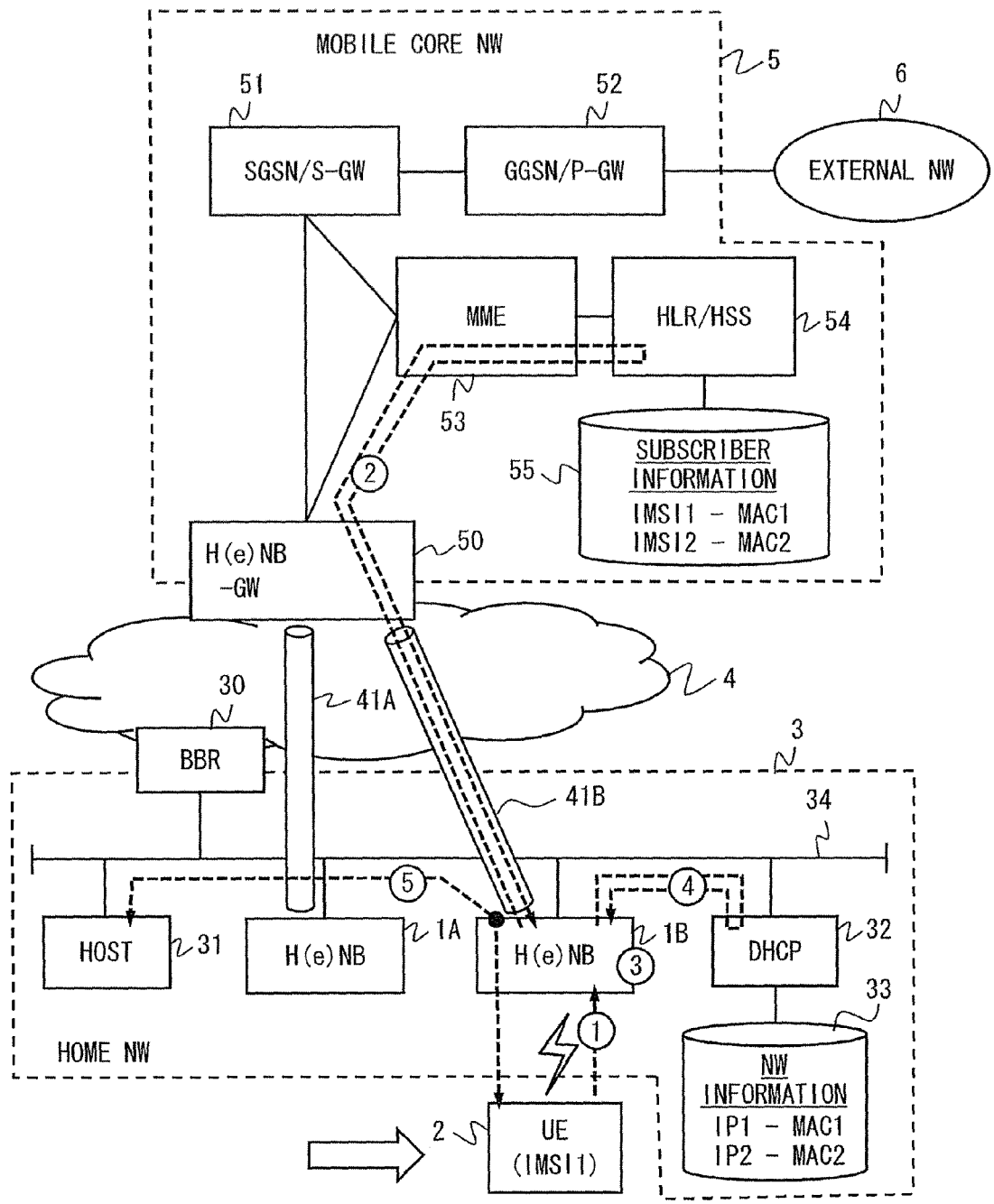
FIG. 10 is a network configuration diagram showing movement of a mobile terminal between home base stations (H(e)NBs) in the mobile communication system shown in FIG. 4.

Hereinafter, the case where the UE 2 has moved from the H(e)NB 1A to the H(e)NB 1B is described below. FIG. 10 is a diagram showing the state where the UE 2 has moved to the H(e)NB 1B. When the UE 2 has moved to the H(e)NB 1B, the same procedural steps (1) to (5) as those described using FIG. 7 are executed. The H(e)N 1B to which the UE 2 has moved thereby acquires the MAC address (MAC1) and the IP address (IP1) of the UE 2 which are the same as those acquired by the H(e)NB 1A from which the UE 2 has moved. Therefore, the H(e)NB 1B to which the UE 2 has moved can continuously perform LIPA communication between the host 31 and the UE 2 using the same MAC address (MAC1) and the IP address (IP1) as those of the H(e)NB 1A from which the UE 2 has moved. Further, because the H(e)NB 1A from which the UE 2 has moved does not need to serve as an anchor, extension of a communication path can be avoided.

Further, according to the illustrative embodiment, there is an advantage that management of IP address assignment to the UE 2 on the communication service user side including a company or the like becomes easy. In general, when a communication service user such as a company desires management of the IP address assigned to the UE 2, it is necessary to set up an authentication server on the corporate NW side and perform assignment of the IP address of the UE 2. On the other hand, in this illustrative embodiment, it is possible to perform management of IP address assignment on the user side without locating an authentication server in the NW of a communication service user. The reason is that Layer 2Layer-2 (MAC layer) management and Layer-3 (IP layer) management can be divided between the mobile core NW 5 and the home NW 3 (corporate NW etc.). Specifically, the UE 2 is permitted to use a unique MAC address (MAC1) as a result of authentication of the UE 2 in the mobile core NW 5, so that the IP-layer and higher layers can be controlled by the home NW 3 (corporate NW etc.).

It is noted that the case where a correspondent node that communicates with the UE 2 is the host 31 on the subnet 34 is described in the above specific example. However, the correspondent node may be a host connected to another subnet (not shown) of the home NW 3. Further, the correspondent node may be another mobile terminal connected to the home NW 3 through the H(e)NB. Furthermore, the correspondent node may be a host that exists in the IP access NW 4 (the Internet etc.) that is accessible through the BBR 30.

Further, the case where the DHCP server 32 exists in the same subnet 34 as the H(e)NBs 1A and 1B is described in the above specific example. However, the DHCP server 32 may exist in a subnet (not shown) different from that of the H(e)NBs 1A and 1B. In this case, a host having the DHCP relay agent function may be placed in the subnet 34, so that the DHCP request and the DHCP response are relayed between the subnet 34 and the DHCP server 32.

Second Illustrative Embodiment

In this illustrative embodiment, an example in which an entity to store the MAC address (MAC1) of the UE 2 is changed from that of the specific example described in the first illustrative embodiment is described. In this illustrative embodiment, the UE 2 stores the MAC address (MAC1) of the UE 2, and the H(e)NBs 1A and 1B acquire the MAC address (MAC1) from the UE 2. The acquisition of the MAC address (MAC1) by the H(e)NBs 1A and 1B may be performed at the timing when transmission/reception of control data with the UE 2 occurs, such as upon receiving an attach request of the UE 2, upon completion of authentication, or upon bearer setting.

Figure 11:
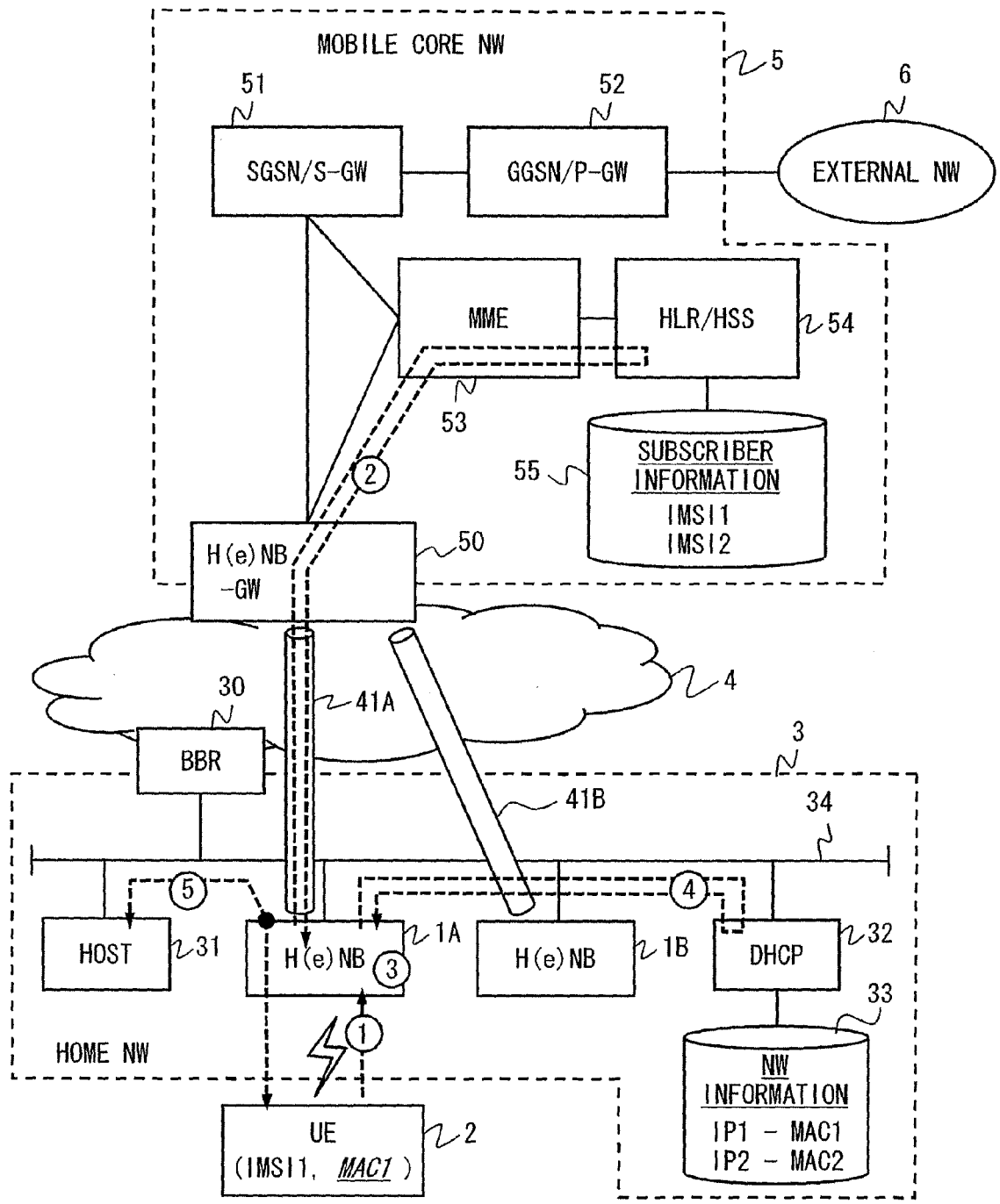
FIG. 11 is a diagram showing a configuration example of a mobile communication system according to a second illustrative embodiment of the invention.

FIG. 11 is a network configuration diagram showing a configuration of a mobile communication system according to this illustrative embodiment and a procedure for UE attach. For example, the UE 2 may add the MAC address (MAC1) to the attach request message to be transmitted to the H(e)NB 1A in the procedural step (1) described using FIG. 7. The address management unit 15 of the H(e)NB 1A may record the MAC address (MAC1) for LIPA communication upon receiving the MAC address from the UE 2, upon completing authentication of the UE 2, or upon completing attach acceptance of the UE 2 by the mobile core NW 5.

Figure 12:
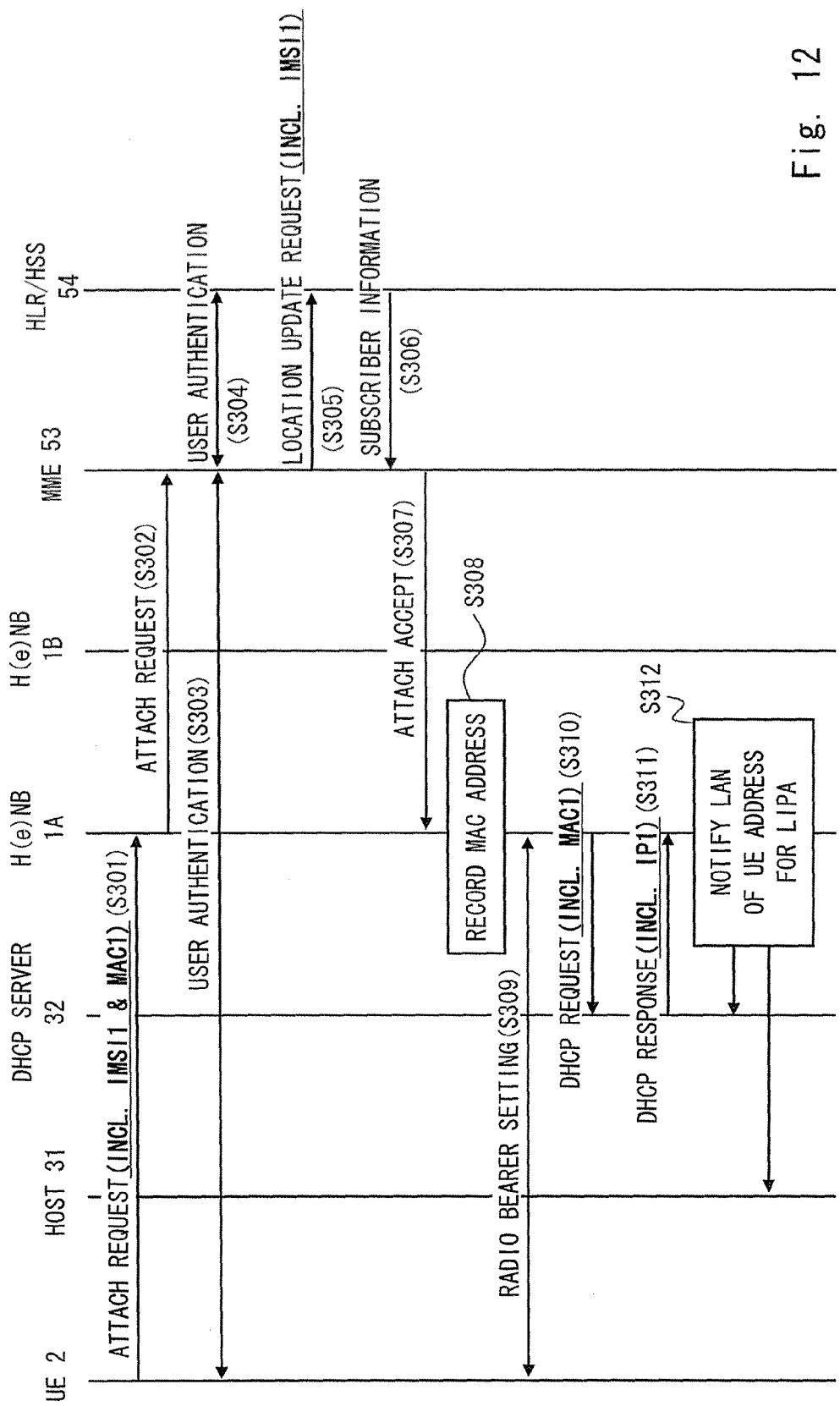
FIG. 12 is a sequence chart showing a specific example of a mobile terminal attach process in the mobile communication system shown in FIG. 12.

FIG. 12 is a sequence chart showing a specific example of operation for UE 2 attach. In the example of FIG. 12, the H(e)NB 1A records MAC1 as the MAC address corresponding to the UE 2 upon completion of attach of the UE 2 by the mobile core NW 5 (Step S308). Steps S301 to S307 are substantially the same as Steps S101 to S107 shown in FIG. 8. They are, however, different in that the MAC address (MAC1) of the UE 2 is included in the attach request in Step S301. Further, they are different in that the MAC address of the UE 2 is not included in the subscriber information transmitted in S306 and the attach accept (context setting request) message transmitted in S307 because the MAC address (MAC1) is not pre-recorded in the subscriber information 55 on the mobile core NW 5 side.

Steps S309 to S312 in FIG. 12 may be the same as Steps S108 to S111 shown in FIG. 8.

Third Illustrative Embodiment

In this illustrative embodiment, an alternative example of the above first and second illustrative embodiments is described. The address management unit 15 included in the H(e)NBs 1A and 1B according to the above second illustrative embodiment may store the MAC address and the IP address of the UE 2 in association with the IMSI just like the first illustrative embodiment. However, to manage the MAC address and the IP address of the UE 2 in the H(e)NBs 1A and 1B, other information may be used instead of the IMSI. Specifically, other information for uniquely identifying the UE 2 in the mobile communication system may be used. For example, the H(e)NBs 1A and 1B may use a terminal identifier (IMEI: International Mobile Equipment Identifier) of the UE 2 for association with the MAC address and the IP address of the UE 2.

Figure 13:
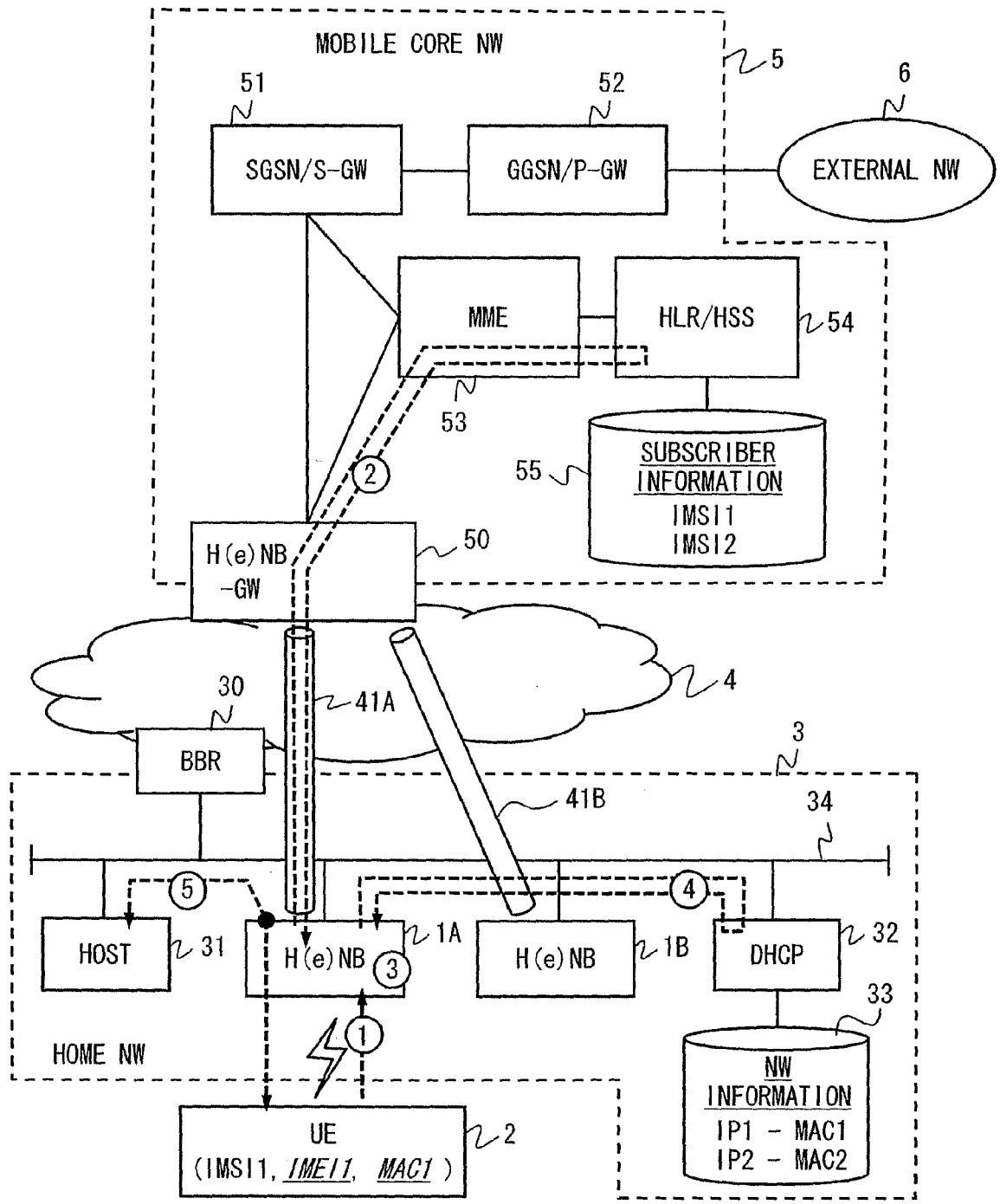
FIG. 13 is a diagram showing a configuration example of a mobile communication system according to a third illustrative embodiment of the invention.

Hereinafter, an example in which the second illustrative embodiment is altered so as to use the IMEI for association with the MAC address and the IP address of the UE 2 is described. FIG. 13 is a network configuration diagram showing a configuration of a mobile communication system according to this illustrative embodiment and a procedure for UE attach. The UE 2 may add the IMEI (e.g. IMEI1) of itself, in addition to the IMSI (IMSI1) and the MAC address (MAC1), to the attach request message that is transmitted in the procedural step (1) described using FIG. 7. The address management unit 15 of the H(e)NB 1A may record the MAC address (MAC1) for LIPA communication upon receiving the MAC address from the UE 2, upon completing authentication of the UE 2, or upon completing attach acceptance of the UE 2 by the mobile core NW 5, for example. At this time, the address management unit 15 uses the IMEI (IMEI1) of the UE 2 for association with the MAC address (MAC1).

Figure 14:
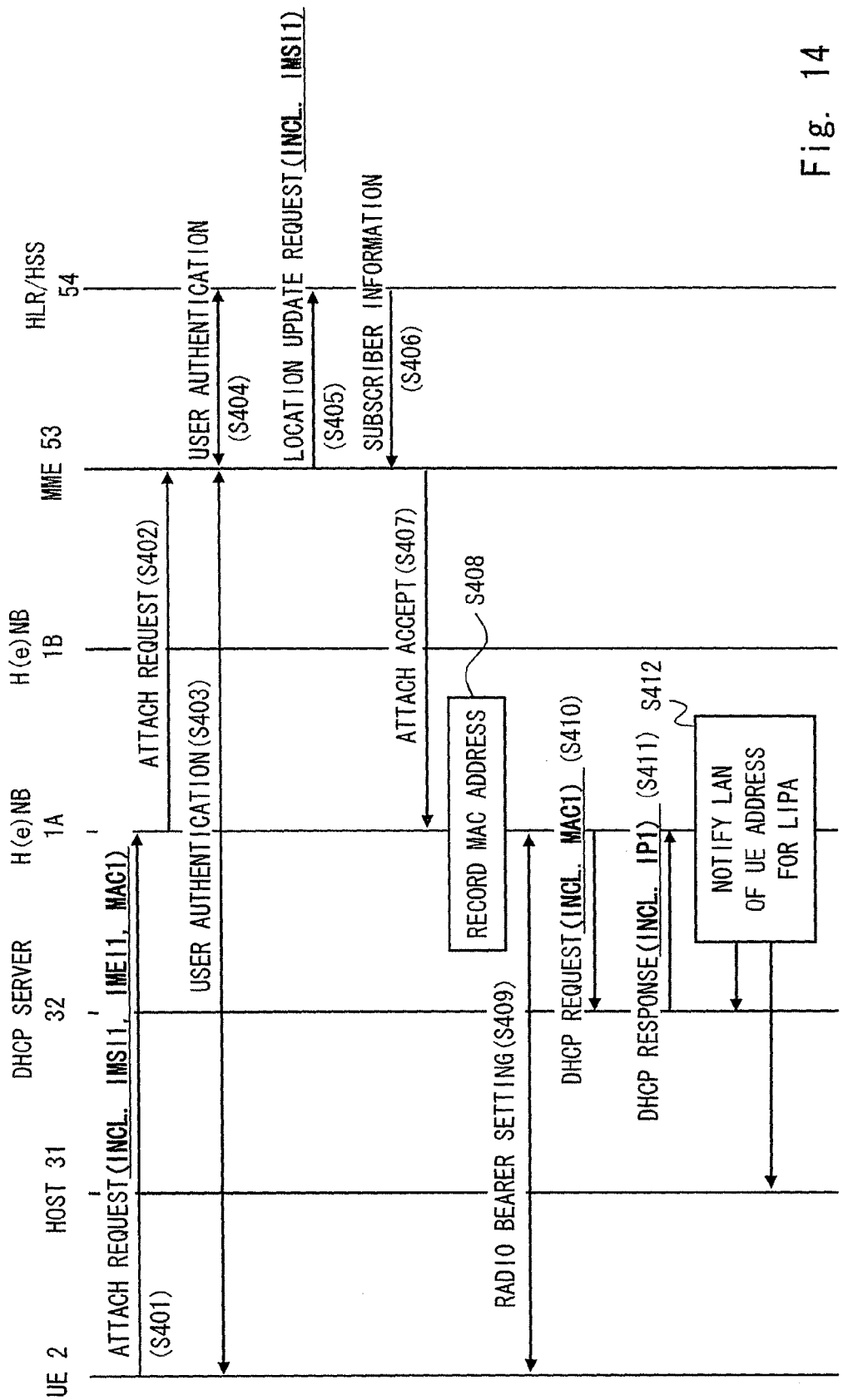
FIG. 14 is a sequence chart showing a specific example of a mobile terminal attach process in the mobile communication system shown in FIG. 13.

FIG. 14 is a sequence chart showing a specific example of operation for UE 2 attach. In Step S401, the UE 2 transmits the attach request message including the IMEI (IMEI1) of the UE 2. The subsequent Steps S402 to S412 may be substantially the same as Steps S302 to S312 shown in FIG. 12. They are, however, different in that the IMEI (IMEI1) of the UE 2 is used for association when the address management unit 15 records the MAC address (MAC1) in Step S408.

It is noted that, although the specific examples of FIGS. 13 and 14 are described as alternative examples of the second illustrative embodiment, the first illustrative embodiment may be altered in the same manner as a matter of course.

Fourth Illustrative Embodiment

Figure 3:
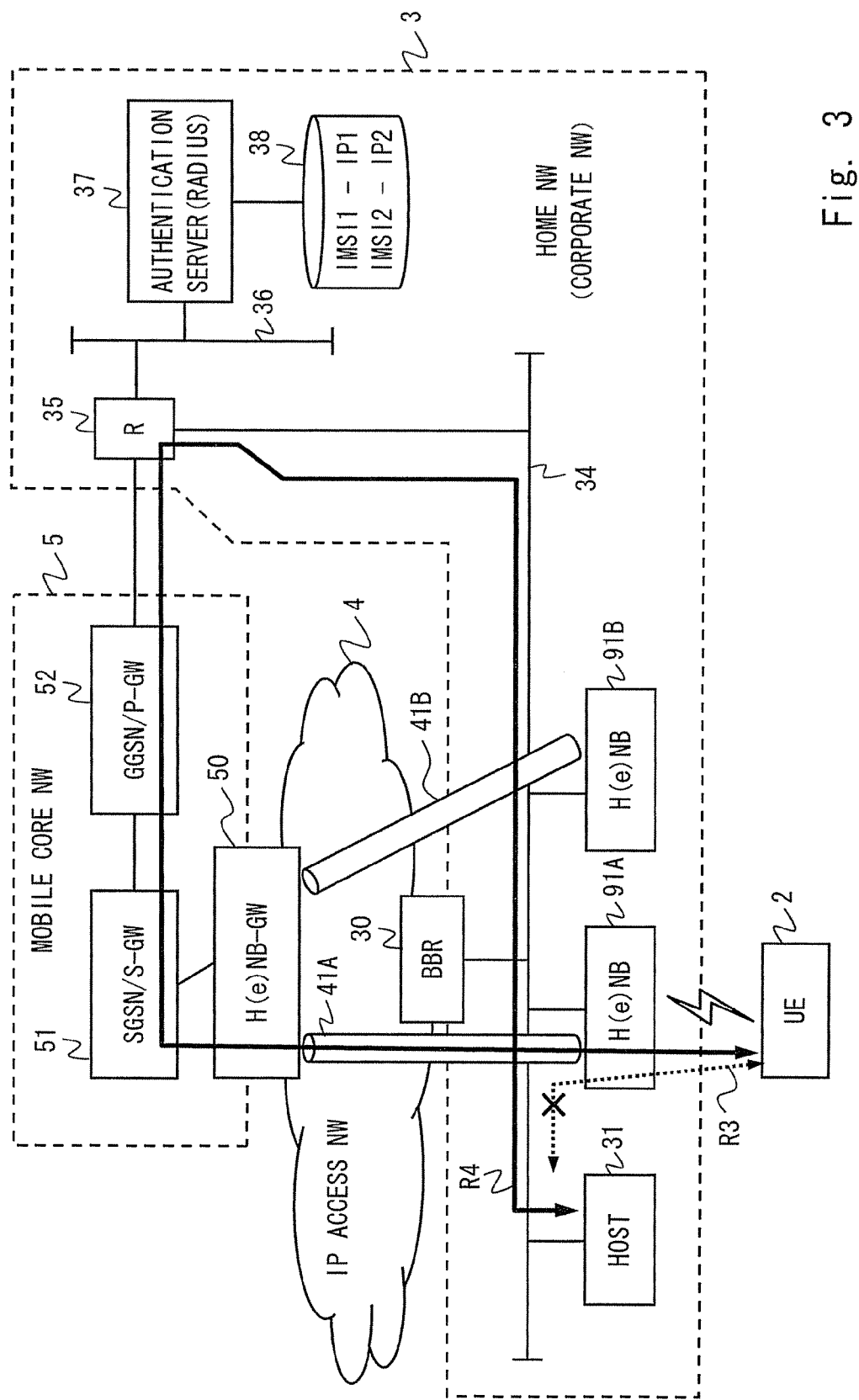
FIG. 3 is a network configuration diagram to describe a problem of a technique to implement LIPA propsed in the 3GPP.

In this illustrative embodiment, an example in which the placement of the function related to authentication of the mobile terminal (UE) is altered from the specific example described above in the first illustrative embodiment is described. When a large company uses the mobile communication service, a scheme that connects an authentication server located in the corporate NW to the mobile core NW and assigns IP addresses to mobile terminals from the authentication server within the corporate NW is used. FIG. 3 shows a configuration example in the case where authentication of a mobile terminal is performed using the authentication server in the corporate NW. Note that FIG. 3 is not a drawing related to the illustrative embodiment but a drawing created by the inventor of the present invention for the purpose of explaining a problem arising in the case of setting up a home base station within the corporate NW.

In the example of FIG. 3, an authentication server 37 such as a RADIUS (Remote Authentication Dial In User Service) server that is located in a subnet 36 of the corporate NW (home NW 3) is connected to the mobile core NW 5 through a router 35. The authentication server 37 stores information 38 of terminals used by employees (hereinafter referred to as employee information 38). The authentication server 37 performs authentication of the UE 2 in response to a request from the mobile core NW 5, and transmits the IP address (IP1) associated with the IMSI (IMSI1) of the UE 2 for which authentication is successful to the mobile core NW 5. The mobile core NW 5 uses the IP address (IP1) included in the response from the authentication server 37 as the IP address at the termination point on the UE 2 side that is established between the P-GW 52 and the UE 2.

In the case where the IP address is assigned from the authentication server 37 to the UE 2 as shown in FIG. 3, communication between the UE 2 and the host 31 on the subnet 34 is carried out via the mobile core NW 5 and a backbone network of the company as shown by the arrow R4 of FIG. 3. In other words, the UE 2 cannot communicate with the host 31 on the subnet 34 directly through the home base station (H(e)NB 91A). The communication path thus becomes too long.

Figure 15:
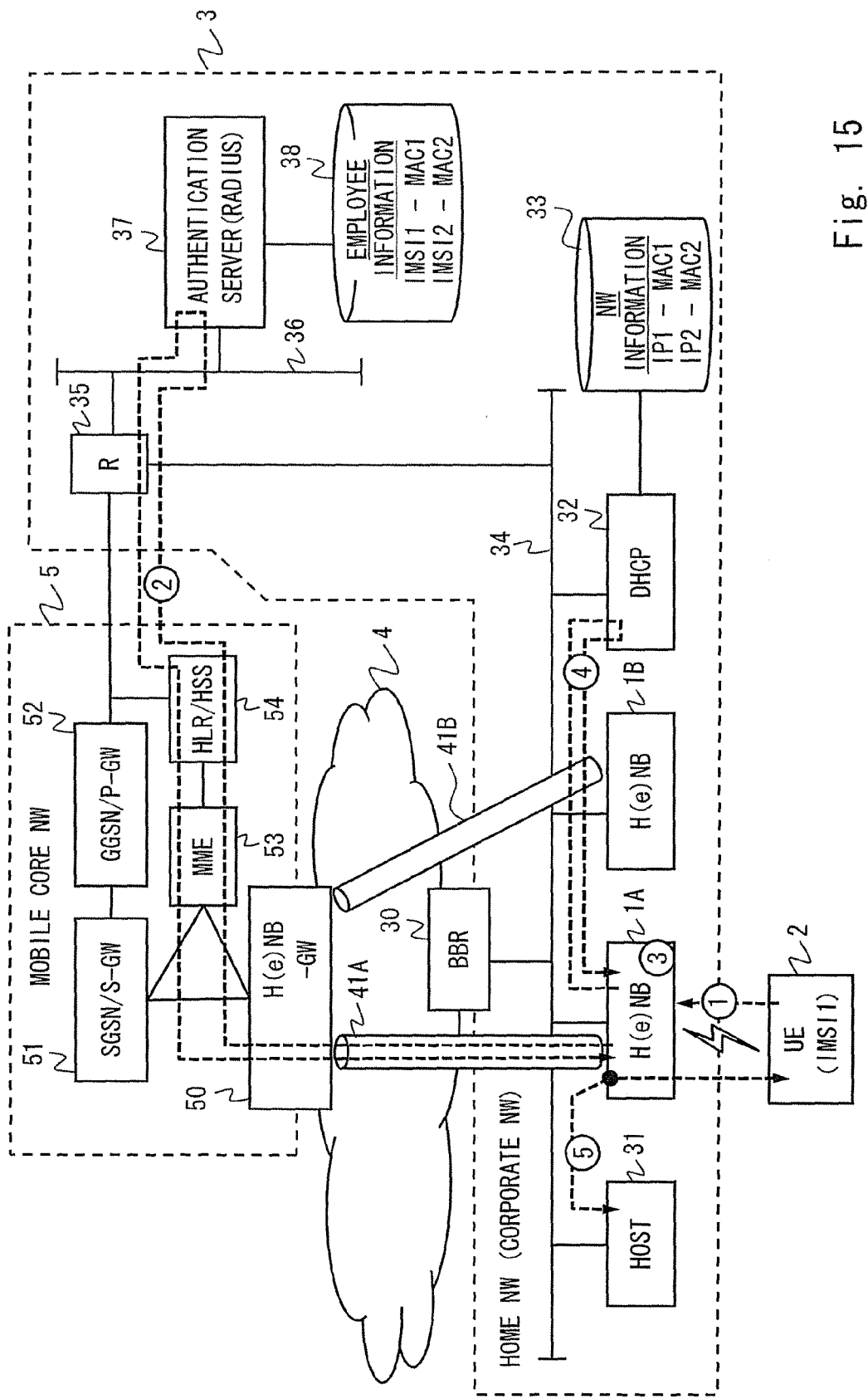
FIG. 15 is a diagram showing a configuration example of a mobile communication system according to a fourth illustrative embodiment of the invention.

On the other hand, FIG. 15 shows a NW configuration example in the case where the H(e)NB 1 to which the concept of the present invention is applied is placed in the corporate NW. The authentication server 37 of FIG. 15 manages the correspondence between a mobile terminal (UE) and a MAC address as the employee information 38. The procedural steps until attach of the UE 2 is made and LIPA communication starts between the UE 2 and the host 31 is the same as the procedural steps (1) to (5) described using FIG. 7. However, the authentication in the procedural step (2) is different. Specifically, in the example of FIG. 15, an authentication request is transferred from the HLR/HSS 54 to the authentication server 37, and authentication of the UE 2 is performed by the authentication server 37. When authentication is successful, the authentication server 37 transmits the MAC address (MAC1) associated with the IMSI (IMSI1) of the UE 2 in the employee information 38 to the HLR/HSS 54.

In this illustrative embodiment, assignment of the MAC address of the UE 2 is performed in the authentication process of the UE 2 by coordination between the mobile core NW 5 and the authentication server 37 on the company side. Then, the H(e)NBs 1A and 1B acquire the IP address (IP1) for the UE 2 that is consistent with the IP address architecture of the subnet 34 using the MAC address (MAC1) uniquely assigned to the UE 2. The IP address (IP1) consistent with the subnet 34 to which the H(e)NBs 1A and 1B are connected can be thereby easily assigned to the UE 2, and access to the host 31 by LIPA can be made, and it is thereby possible to improve the continuity of a communication when the UE 2 moves between the H(e)NBs.

Fifth Illustrative Embodiment

A function of performing IP communication between the host 31 such as a server within the home NW 3 (corporate NW etc.) and a mobile terminal connecting with a macro cell by transferring an IP packet from the mobile terminal to the anchor GW function (SSGN/P-GW function) of the H(e)NB that is predetermined by subscription contract or the like is under study. The function is called "Remote IP Access". The technique of acquiring and generating an IP address using the MAC address of the mobile terminal that is described in the above first to third illustrative embodiments can be used when the anchor GW function of the H(e)NB acquires and generates an IP address for a mobile terminal during Remote IP Access (which is referred to hereinafter as RIPA).

Figure 16:
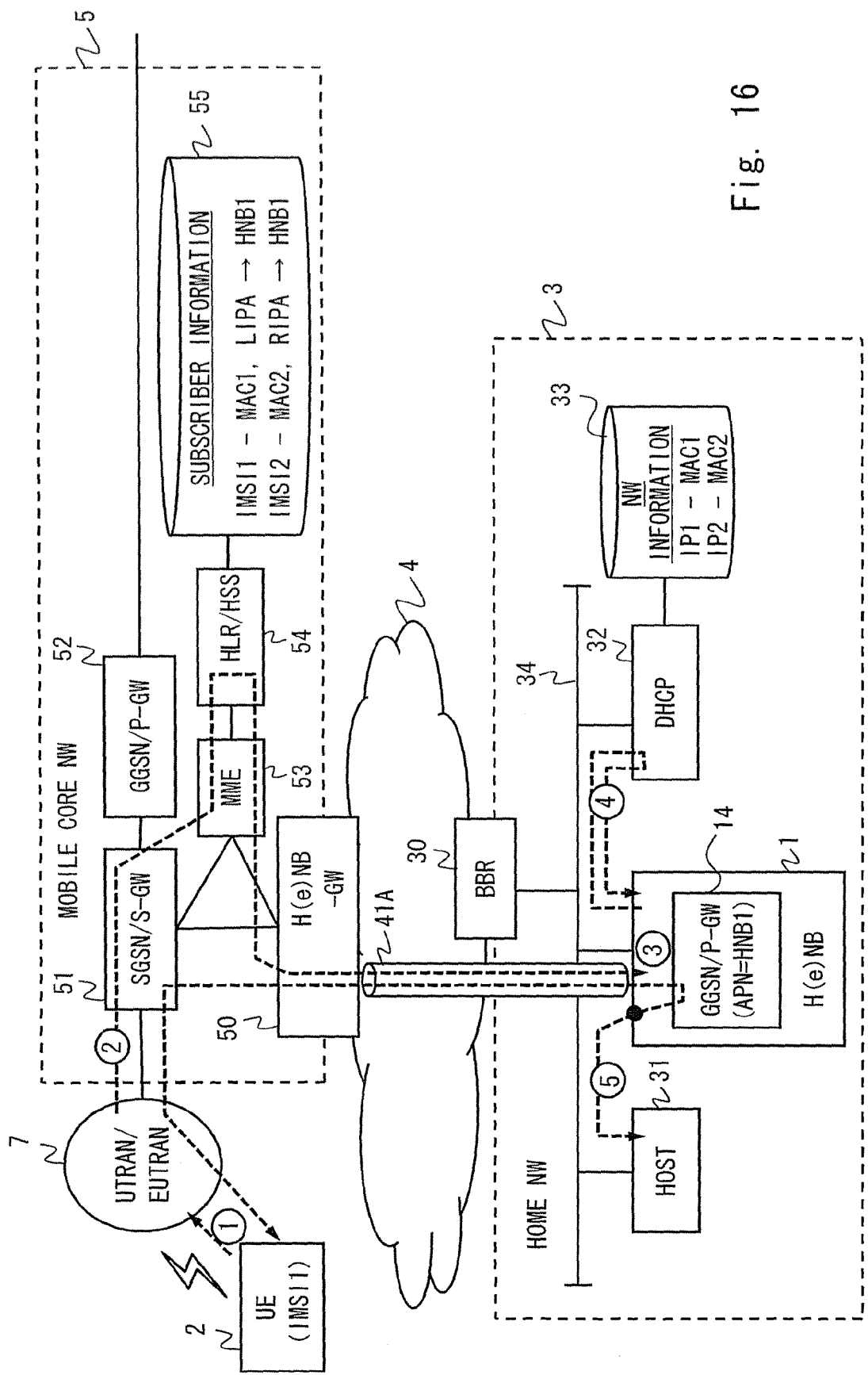
FIG. 16 is a diagram showing a configuration example of a mobile communication system according to a fifth illustrative embodiment of the invention.

FIG. 16 shows a configuration example of a mobile communication system that supports RIPA. It is assumed in the example of FIG. 16 that the H(e)NB 1 having the LIPA function is designated as APN for the UE 2 to perform RIPA. The designation of the APN can be recorded in the subscriber information (contract information) 55. The MME 53 starts bearer setting between the UE 2 and the gateway function (GGSN/P-GW function) of the H(e)NB 1 based on the contract APN information included in the subscriber information 55.

Consider the case where the UE 2 that has made LIPA communication by connection to the H(e)NB 1 has performed handover to a macro cell (UTRAN/EUTRAN 7). When the UE 2 accesses the user NW via the UTRAN/EUTRAN 7 (i.e. when performing RIPA), the UE 2 connects to the macro cell (UTRAN/EUTRAN 7) and transmits a connection setting request including designation of APN (Access Point Name) for performing RIPA to the UTRAN/EUTRAN 7 (circle number 1 in FIG. 16). APN for RIPA is the same as APN for LIPA, and it is designated as "LIPA", for example. The connection setting request from the UE 2 is transferred to the MME 53.

The MME 53 performs authentication of the UE 2 with the HSS 54 (circle number 2 in FIG. 16). In the subscriber information 55, the H(e)NB 1 is registered as the anchor GW (GGSN/P-GW) of LIPA for the UE 2 (IMSI1). Therefore, the MME 53 starts bearer setting between the UE 2 and the H(e)NB 1. At the time of bearer setting, the H(e)NB is notified of the MAC address (MAC1) of the UE 2. The address management unit 15 of the H(e)NB 1 records the MAC address (MAC1) of the UE 2 (circle number 3 in FIG. 16).

The LIPA communication control unit 14 that serves as the anchor GW function (SSGN/P-GW function) in the H(e)NB 1 transmits a DHCP request including the MAC address (MAC1) of the UE 2 to the subnet 34 and receives assignment of the IP address (IP1) for the UE 2 from the DHCP server 32 (circle number 4 in FIG. 16).

When the UE 2 accesses the host 31, the path indicated by the arrow with the circle number 5 in FIG. 15 is used. The MAC address (MAC1) and the IP address (IP1) of the UE 2 are used for the MAC frame and the IP packet that are transmitted and received between the H(e)NB 1 and the host 31, which is the same as the case of LIPA described in the first to fourth illustrative embodiments.

According to this illustrative embodiment, when the UE 2 performs handover from a femtocell (H(e)NB 1) to a macro cell (UTRAN/EUTRAN 7), communication between the UE 2 and the host 31 can be performed continuously using the same MAC address and IP address before and after the handover. Further, when the UE 2 that has performed RIPA to the user NW 3 via the macro cell (UTRAN/EUTRAN 7) performs handover to the femtocell (H(e)NB 1) as well, communication between the UE 2 and the host 31 can be performed continuously using the same MAC address and IP address.

Sixth Illustrative Embodiment

The case where the home base station (H(e)NB) has the LIPA function is described in the above first to fifth illustrative embodiments. However, it is studied that the LIPA function is given to the home base station GW (H(e)NB-GW). It is also studied that the home base station GW (H(e)NB-GW) is placed in the user NW (home NW 3) for a large-scale user such as a company. The technical idea that the home base station (H(e)NB) performs LIPA communication using the MAC address uniquely assigned to the UE, which is described in the first to fifth illustrative embodiments, is also applicable to the case where the home base station GW (H(e)NB-GW) has the LIPA function. In this illustrative embodiment, a mobile communication system in which the home base station GW (H(e)NB-GW) that supports LIPA is placed in the home NW 3 is described.

Figure 17:
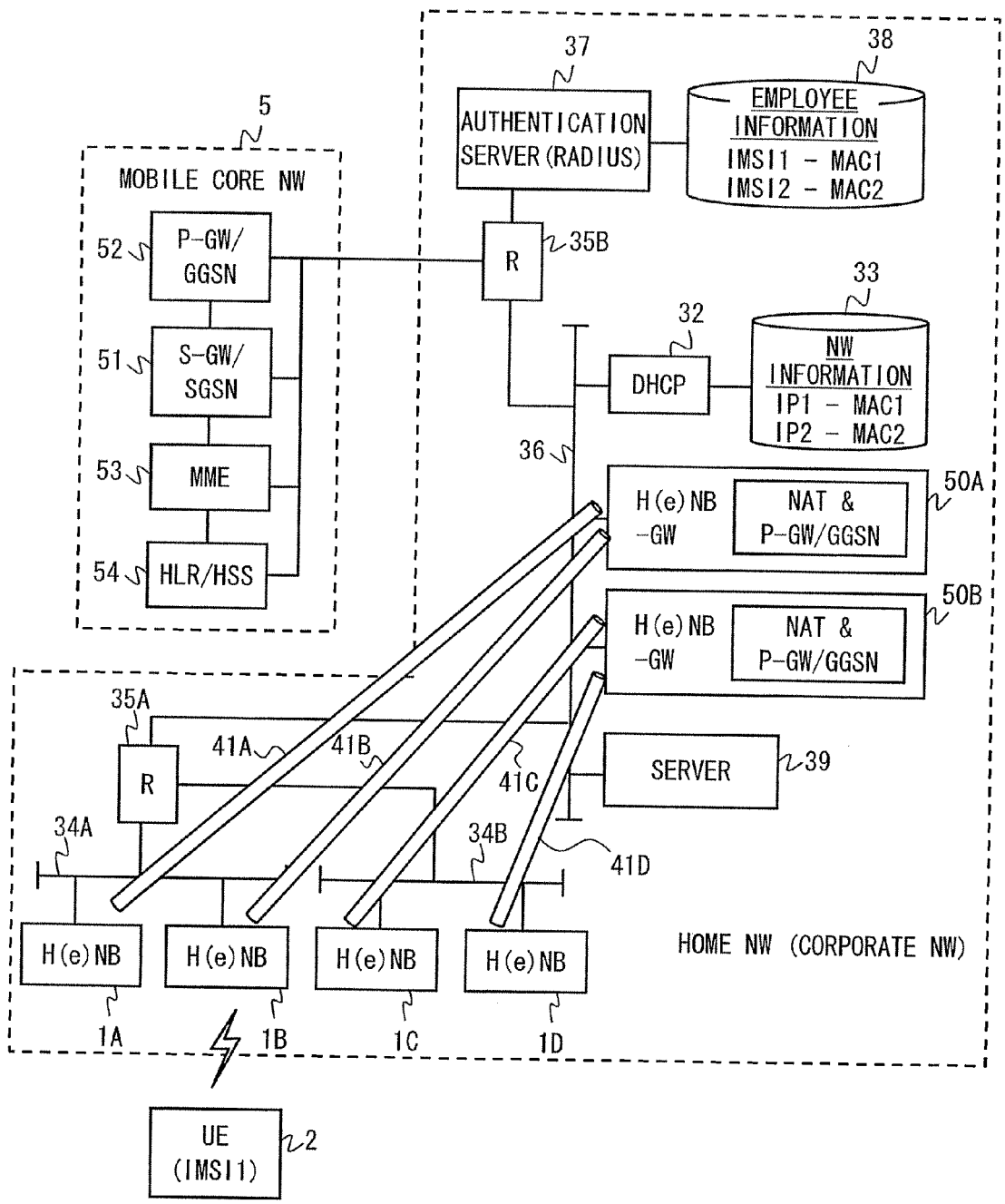
FIG. 17 is a diagram showing a configuration example of a mobile communication system according to a sixth illustrative embodiment of the invention.

FIG. 17 shows a configuration example of a large-scale corporate NW. In the example of FIG. 17, two home base station gateways H(e)NB-GWs 50A and 50B are located in a main subnet 36 of a corporate NW (the home NW 3). The H(e)NB-GW 50A manages H(e)NBs 1A and 1B that are connected to a subnet 34A. The H(e)NB-GW 50B manages H(e)NBs 1C and 1D that are connected to a subnet 34B.

Further, the H(e)NB-GWs 50A and 50B of FIG. 17 have the LIPA communication function similar to that of the H(e)NB 1 (1A and 1B) described above in the first to fifth illustrative embodiments. Specifically, the H(e)NB-GWs 50A and 50B are able to acquire and store the MAC address uniquely assigned to the UE 2, and perform LIPA communication using the MAC address of the UE 2.

Therefore, even when the gateway when performing LIPA communication has changed from the H(e)NB-GW 50A to 50B due to the movement of the UE 2 between the H(e)NBs, the H(e)NB-GW 50B can continuously use the MAC address and the IP address of the UE 2 which is the same as those used by the H(e)NB-GW 50A for LIPA communication.

Further, according to this illustrative embodiment, in the case of performing LIPA communication from the H(e)NB-GW located in the main subnet 36 of a company, it is not necessary to associate the UE that is permitted to connect to the corporate NW (home NW 3) with any of the H(e)NB-GWs in advance. If the association needs to be configured in advance, there is a problem that management in the corporate NW is complicated. On the other hand, because such pre-configuration (i.e. association between the UE and the H(e)NB-GW) is not needed in this illustrative embodiment, management is easy.

It is noted that FIG. 17 shows an example of setting secure communication paths 41A to 41D such as IPsec between the H(e)NB-GWs 50A and 50B and the H(e)NBs 1A to 1D. However, encryption by IPsec or the like is not necessarily performed between the H(e)NB-GWs 50A and 50B and the H(e)NBs 1A to 1D, which is communication within the corporate NW. Whether to set secure communication paths such as IPsec or not may be determined as appropriate based on security agreements of a mobile operator and a user (company). On the other hand, in order to encrypt communication between the corporate NW (home NW 3) and the mobile core NW 5, security gateways that pair up with the H(e)NB-GWs 50A and 50B may be installed in the mobile core NW side. Insted, a security gateway may be installed in the mobile core NW 5, and a secure communication path such as IPsec path may be established between the security gateway and a router 35B of the corporate NW.

Figure 18:
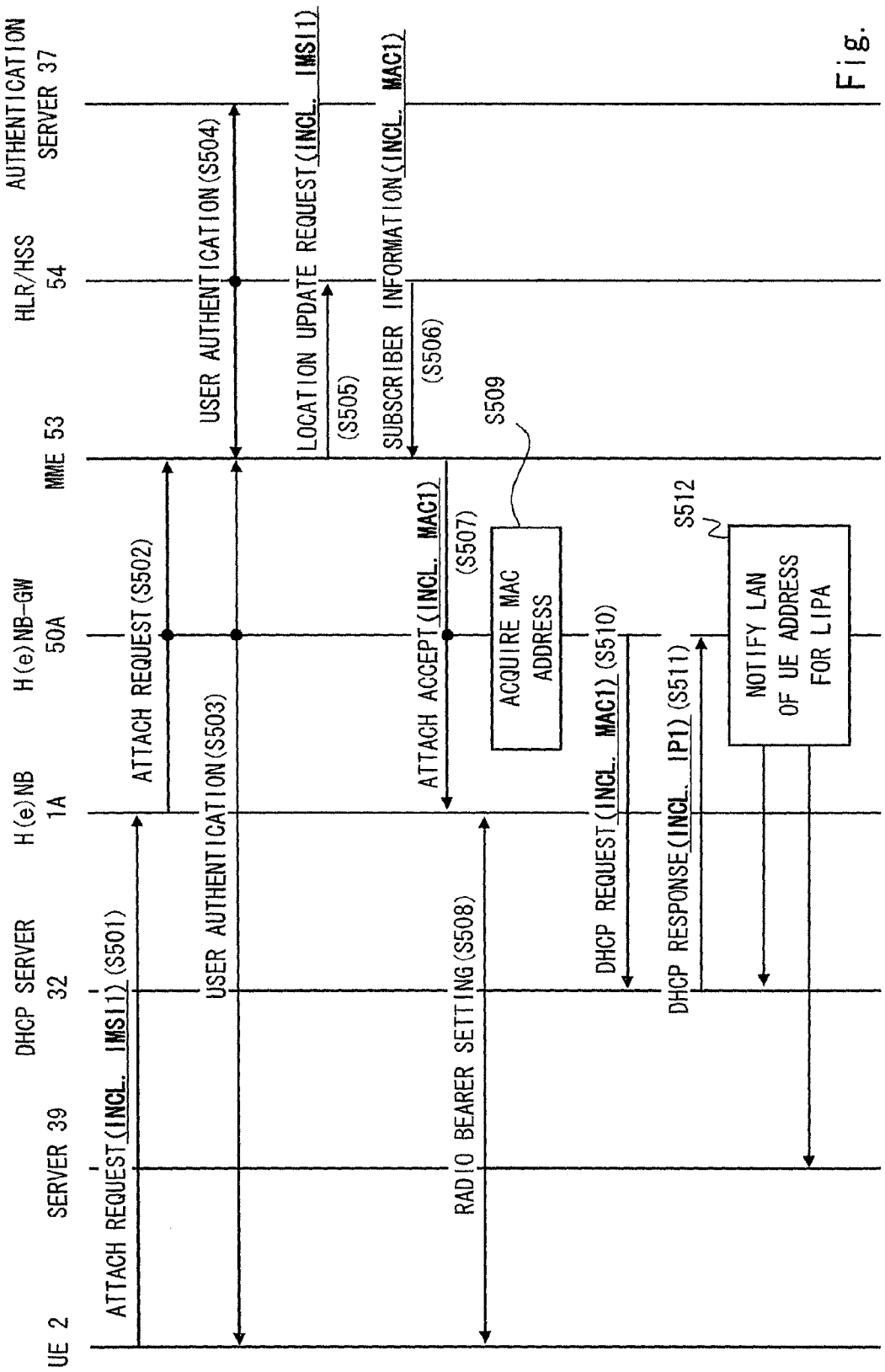
FIG. 18 is a sequence chart showing a specific example of a mobile terminal attach process in the mobile communication system shown in FIG. 17.

FIG. 18 is a sequence chart showing a specific example of an attach procedure of the UE 2 in this illustrative embodiment. Steps S501 to S508 are the same as Steps S101 to S108 shown in FIG. 8. In Step S509, the H(e)NB-GW 50A monitors the attach accept message that is transmitted from the MME 53 to the H(e)NB 1A and acquires the MAC address (MAC1) of the UE 2 that is included in the attach accept message. After that, the H(e)NB-GW 50A performs the IP address acquisition of the UE 2 (Steps S510 to S511) and broadcasts the MAC address of the UE 2 to the LAN (to the subnet 34) (Step S512). Steps S510 to S512 are the same as Steps S109 to S111 of FIG. 8 except that the operation is carried out by the H(e)NB-GW 50A.

Figure 19:
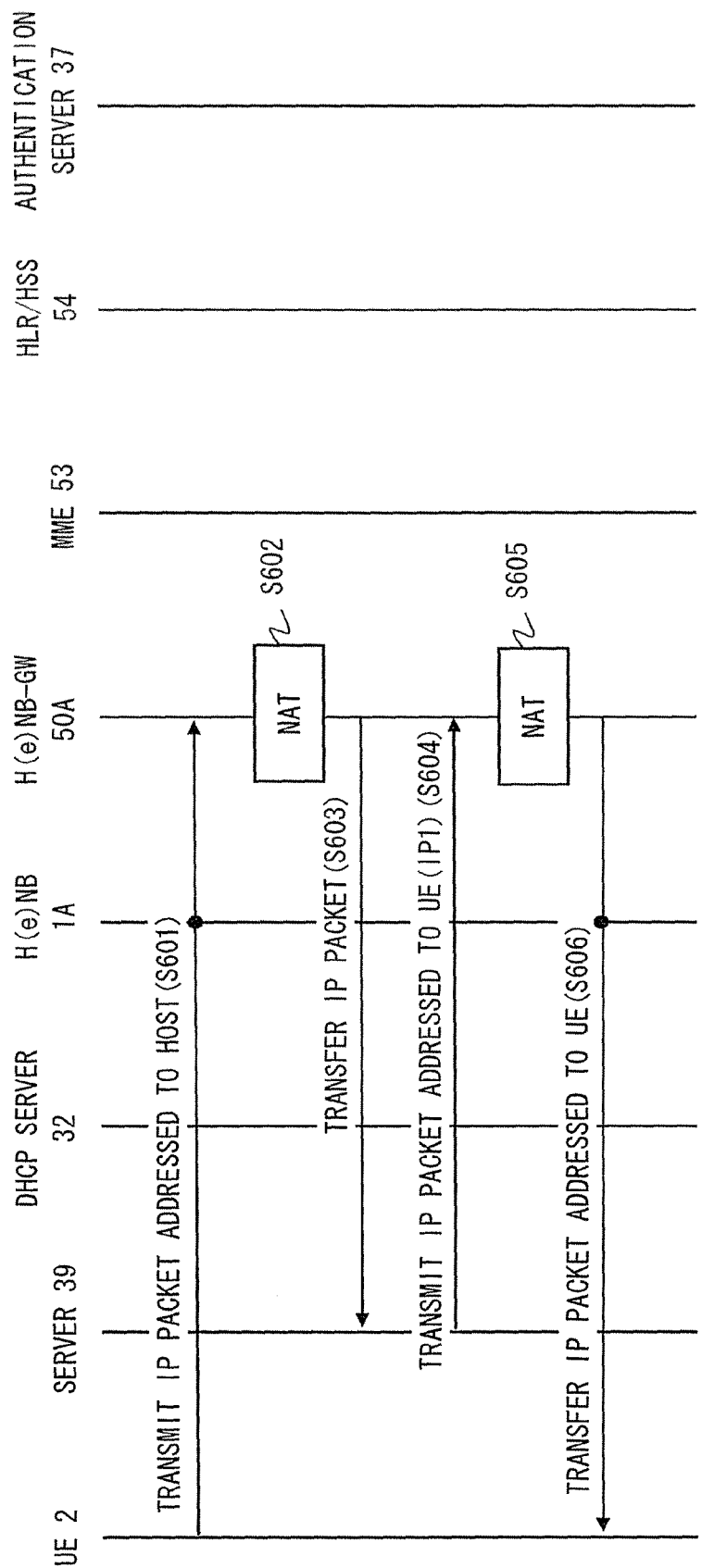
FIG. 19 is a sequence chart related to L PA operation in a home base station GW (H(e)NB-GW) shown in FIG. 17.

FIG. 19 is a sequence chart showing a specific example of the LIPA communication procedure of the UE 2 in this illustrative embodiment. Steps S601 to S606 in FIG. 19 are the same as Steps S201 to S206 in FIG. 9 except that an entity acting as a gateway with the home NW 3 is the H(e)NB-GW 50A rather than the H(e)NB 1A.

Seventh Illustrative Embodiment

Figure 20:
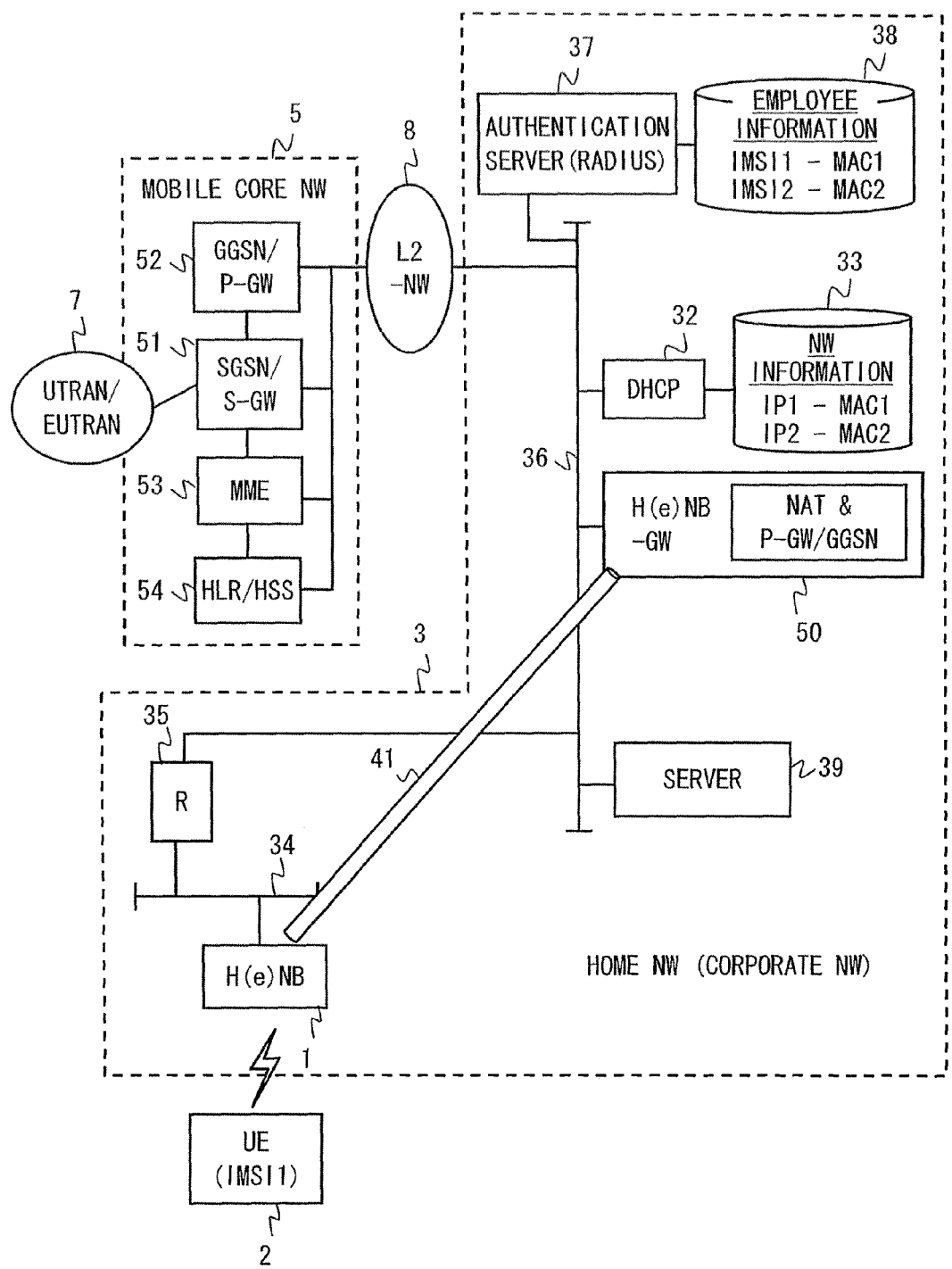
FIG. 20 is a diagram showing a configuration example of a mobile communication system according to a seventh illustrative embodiment of the invention.

FIG. 20 shows a configuration example of a mobile communication system according to this illustrative embodiment. In this illustrative embodiment, an example of suppressing a change in MAC address and IP address when a mobile terminal (UE 2) accesses an external network (home NW 3) in the case where the mobile terminal (UE 2) moves from the home base station (H(e)NB 1) to the macro cell (UTRAN/EUTRAN 7) is described. Upon occurrence of movement of the UE 2 between the home base station (H(e)NB 1) and) 5 the macro cell base station (UTRAN/EUTRAN 7), a gateway to the external network (home NW 3) changes from the home base station (H(e)NB 1) to an external NW-GW (GGSN/P-GW 52) of the mobile core NW 5. According to this illustrative embodiment, it is possible to contribute to reduction of the service down time in the case where such a change of the gateway occurs and thereby improve the continuity of a communication between the UE 2 and the external network (home NW 3).

In FIG. 20, the home NW 3 and the GGSN/P-GW 52 are connected by a Layer-2 network (L2-NW) 8. The L2-NW 8 means a network that the broadcast frame of Layer-2 can reach. Accordingly, a H(e)NB-GW 51A that supports LIPA and the GGSN/P-GW 52 in the mobile core NW 5 belong to the same subnet 36. For the L2-NW 8, a commercial Layer-2 connection service such as a Wide Area Ethernet (registered trademark) service may be used.

In FIG. 20, the UE 2 is connecting to the H(e)NB 1 that is located in the home NW 3. In this case, the UE 2 can directly access a host such as a server 39 in the home NW 3 without through the mobile core NW 5 by the LIPA function of the H(e)NB-GW 50A. The attach procedure of the UE 2 and the procedure related to LIPA communication may be the same as those described in the sixth illustrative embodiment.

Figure 21:
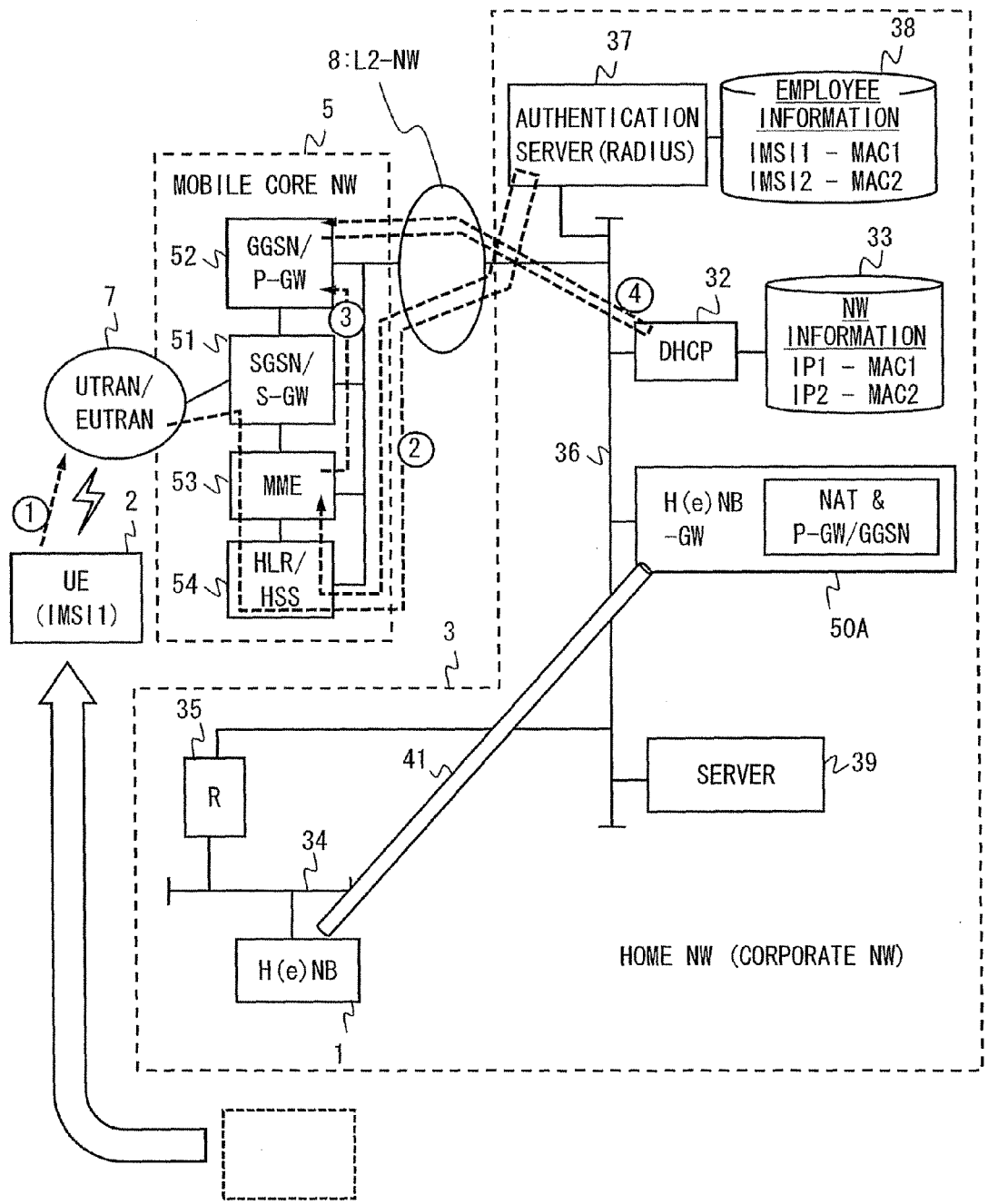
FIG. 21 is a network configuration diagram showing operation when a mobile terminal moves in the mobile communication system shown in FIG. 20.

FIG. 21 shows an operation in the case where the UE 2 has moved from the H(e)NB 1 to the macro cell (UTRAN/EUTRAN 7). First, the UE 2 connects to the macro cell base station UTRAN/EUTRAN 7 (circle number 1 in FIG. 21). Next, authentication of the UE 2 is performed. When authentication is successful, the MME 53 acquires the MAC address (MAC1) assigned to the UE 2 (circle number 2 in FIG. 21) in the same manner as described in the other illustrative embodiments.

Then, the MME 53 notifies the GGSN/P-GW 52 of the MAC address (MAC1) assigned to the UE 2 (circle number 3 in FIG. 21). The GGSN/P-GW 52 records the MAC address (MAC1) of the UE 2 received from the MME 53. The GGSN/P-GW 52 makes inquiry to the DHCP server 32 of a network (home NW 3) of a company A using the MAC address (MAC1) of the UE 2. Then, the GGSN/P-GW 52 acquires the IP address (IP1) associated with the MAC address (MAC1) of the UE 2 from the DHCP server 32 (circle number 4 in FIG. 21). After that, the GGSN/P-GW 52 may transmit an ARP reply or a Neighbor Advertisement packet in order to instantaneously update a forwarding table of Layer-2 switches (not shown) that are arranged in the subnet 36.

The GGSN/P-GW 52 performs communication between the UE 2 and the home NW 3 using the MAC address (MAC1) of the UE 2 just like the H(e)NB 1, the H(e)NB-GW 50A and the like described in the above first to sixth illustrative embodiments. Specifically, the GGSN/P-GW 52 generates a MAC frame in which the MAC address (MAC1) of the UE 2 is set as the source MAC address and transmits it to the subnet 36 through the L2-NW 8 when transferring the transmission IP packet from the UE 2 to the subnet 36. Further, the GGSN/P-GW 52 receives a MAC frame in which the MAC address (MAC1) of the UE 2 is set as the destination MAC address from the subnet 36 and extracts the IP packet addressed to the UE 2. Then, the GGSN/P-GW 52 converts the destination IP address of the IP packet addressed to the UE 2 according to need and transmits the IP packet addressed to the UE 2 to a bearer on which IP packets can reach the UE 2.

According to this illustrative embodiment, even when a gateway to the external network (home NW 3) has changed from the home base station GW (H(e)NB-GW 50) to the external NW-GW (GGSN/P-GW 52) of the mobile core NW 5 due to movement of the mobile terminal from the home base station to the macro cell base station, there is no change in the MAC address and the IP address when the UE 2 accesses the home NW 3. Therefore, according to the illustrative embodiment, it is possible to contribute to reduction of the service down time upon occurrence of a change of the gateway and thereby improve the continuity of a communication between the UE 2 and the external network (home NW 3).

Note that, while notifying the GGSN/P-GW 52 of the MAC address of the UE 2, the MME 53 may notify the GGSN/P-GW 52 of the IP address (IP1) of the UE 2 (circle number 3 in FIG. 21). In this case, the inquiry to the DHCP server 32 by the GGSN/P-GW 52 may be skipped. The MME 53 may receive the IP address (IP1) together with the MAC address (MAC1) of the UE 2 by a response from the authentication server 37.

When the UE 2 connecting to the H(e)NB 1 in the corporate NW (home NW 3) comes out of the cover area of the H(e)NB 1 as it moves within the corporate building or campus, there is a case where the UE 2 connects to the macro cell base station. In the case where the UE 2 before movement has communicated with the server 39 in the home NW 3 by the LIPA function of the H(e)NB-GW 50A located in the main subnet 36, the communication path with the server 39 is switched to go through the GGSN/P-GW 52. At this time, in the case where the mobile core NW 5 and the home NW 3 are connected by Layer-3 connection (IP layer connection), a problem that communication between the UE 2 and the server 39 discontinues occurs due to a change of the IP address.

On the other hand, as described in this illustrative embodiment, by connecting the mobile core NW 5 and the home NW 3 by Layer-2 and using the MAC address of the UE 2 commonly between the gateways before and after movement (i.e. the H(e)NB-GW 50A and the GGSN/P-GW 52), the movement between the femtocell and the macro cell can be done easily and smoothly.

It is noted that the case where the H(e)NB-GW 50 has the LIPA function is described above in this illustrative embodiment. However, the illustrative embodiment is applicable also to the case where the H(e)NB has the LIPA function as described in the first to fifth illustrative embodiments and the like as a matter of course.

Eighth Illustrative Embodiment

In the first to sixth illustrative embodiments described above, the case where the home base station (H(e)NB) 1 or the home base station GW (H(e)NB-GW) 50 acquires the MAC address of the UE 2 is described. However, the home base station (H(e)NB) 1 may acquire an interface identifier for uniquely generating the MAC address of the UE 2 and generate the MAC address of the UE 2 from the interface identifier instead of directly acquiring the MAC address. Among such interface identifies is an IPv6 interface identifier (IID). The IPv6 IID is used to assign an IPv6 address to an IPv6 host. The IPv6 address is generated by combining a network prefix and an IID.

Figure 22:
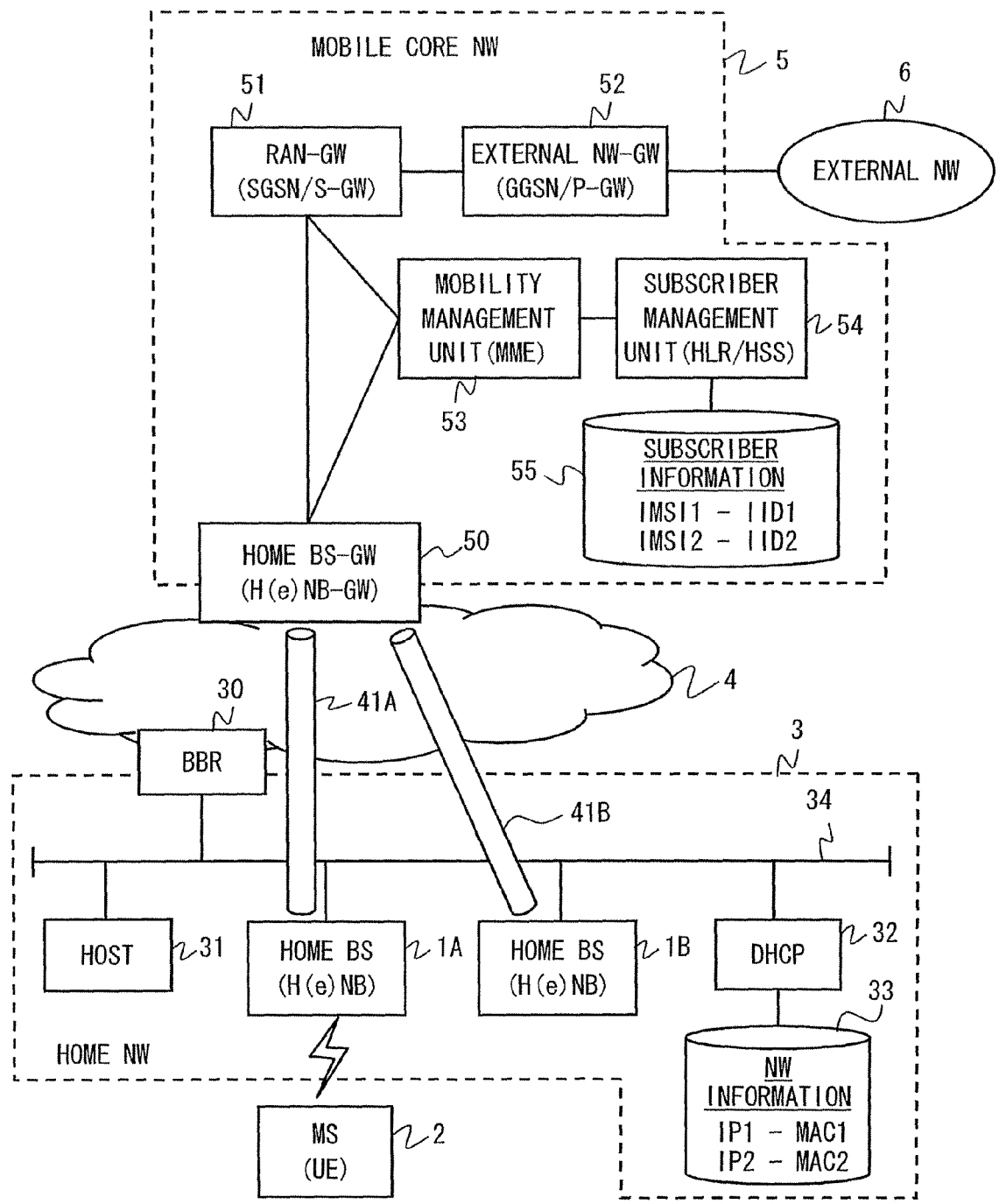
FIG. 22 is a diagram showing a configuration example of a mobile communication system according to an eighth illustrative embodiment of the invention.

FIG. 22 shows a configuration example of a mobile communication system according to this illustrative embodiment. In the configuration example of FIG. 22, the contents of the subscriber information are changed from the configuration of FIG. 4 described above. In the subscriber information 55 shown in FIG. 22, the IID of the UE 2 is included in placed of the MAC address of the UE 2. The H(e)NB 1A of FIG. 22 receives the IID of the UE 2 from the subscriber management unit 54 in the same procedure as the MAC address acquisition procedure described in the first illustrative embodiment. Then, the H(e)NB 1A generates the MAC address of the UE 2 from the received IID of the UE 2.

Figure 23:
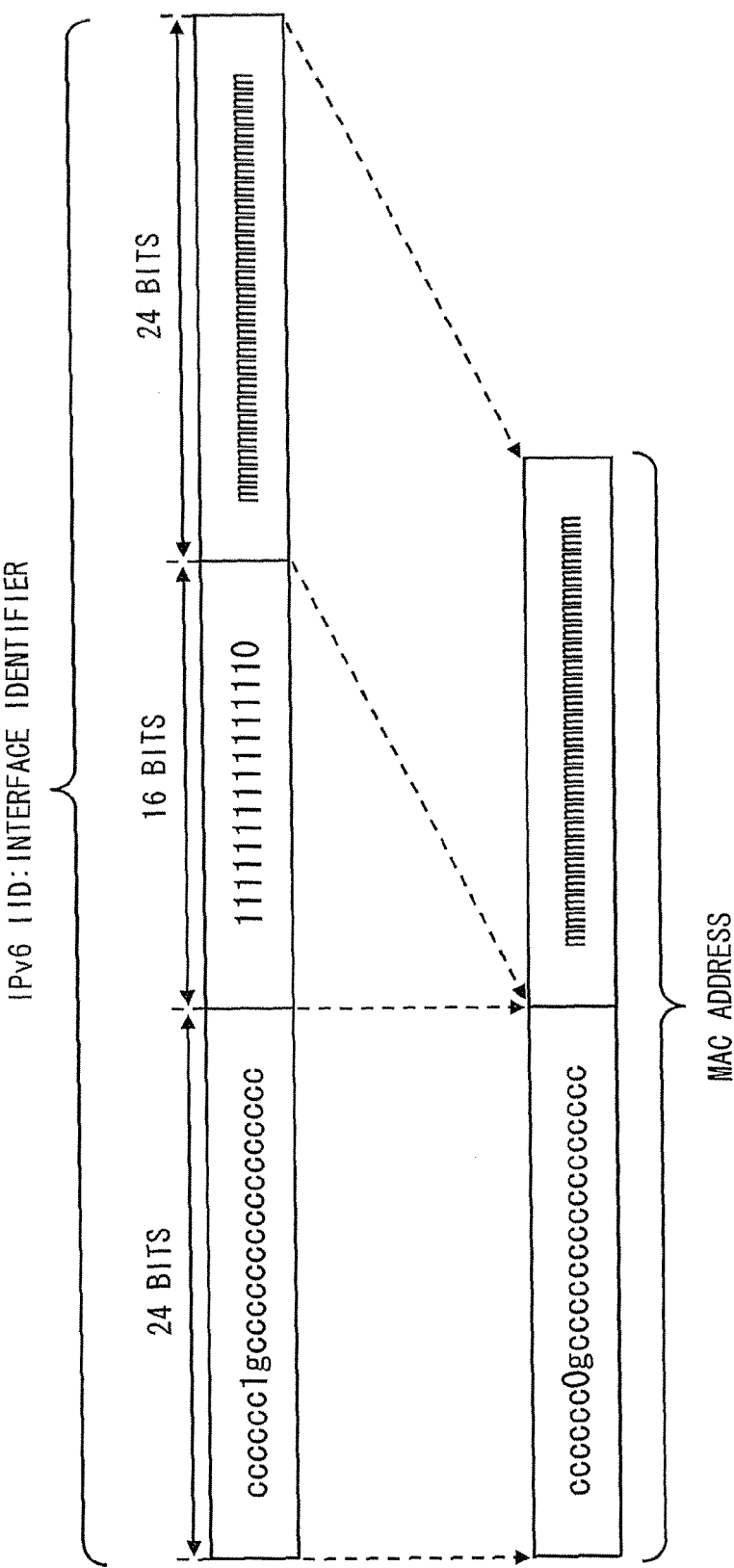
FIG. 23 is a diagram showing a correspondence between IPv6 IID and MAC address (example of EUI-64 format)

For example, in the case of using the EUI-64 (Extended Universal Identifier-64 bit) format. the MAC address of 48 bit length can be uniquely generated from the IID of 64 bit length. FIG. 23 shows the correspondence between the 64-bit length IID and the 46-bit length MAC address.

Other Illustrative Embodiments

In the first to seventh illustrative embodiments described above, the case where the present invention is applied to the 3GPP UMTS and EPS is described. However, the application of the present invention is not limited to UMTS and EPS. For example, the present invention may be applied to the 3GPP2 home base station that supports Local IP Access. Further, the present invention may be applied to the WiMAX home base station that supports Local IP Access. In the case of WiMAX, the mobile terminal has the MAC address. Therefore, the home base station may acquire the MAC address from the mobile terminal and record it in the same procedure as described in the second illustrative embodiment.

Further, in the first to seventh illustrative embodiments, the case where IPv4 or IPv6 is used for Layer-3 of the home NW 3, and a wired LAN in compliance with the IEEE802.3 series standard or the like or a wireless LAN in compliance with the IEEE802.11 series standard or the like is used for Layer-2 of the home NW 3 is described. Stated differently, the case where the IPv4 address or the IPv6 address is used as the Layer-3 address of the home NW 3, and the MAC address is used as the Layer-2 address of the home NW 3 is described. However, the present invention is applicable to other combinations of Layer-2 and Layer-3.

Further, the above-described illustrative embodiments can be combined as desirable by one of ordinary skill in the art. Furthermore, the present invention is not limited to the illustrative embodiments described above, and various changes and modifications may be made without departing from the scope of the invention.

According to the above-described illustrative embodiments, the following advantages can be obtained as well.

(1) In the case where a plurality of home base stations are set up in a home NW (corporate NW or the like), even when a mobile terminal moves from the home base station to another base station, there is no dependence on the home base station before movement and Layer-3 communication continues.

(2) An administrator of the home NW can have the authority to assign a Layer-3 address to a mobile terminal without depending on a mobile operator. The administrator of the home NW can thereby easily perform network management.

(3) With use of the home base station or the home base station GW described in the above illustrative embodiments, when a notebook PC (Personal Computer) and the like equipped with a communication device such as 3GPP, 3GPP2 and WiMAX perform communication, they can access the home NW in the same manner as communication via wireless LAN.

This application is based upon and claims the benefit of priority from Japanese patent application No. 2009-236228, filed on Oct. 13, 2009, the disclosure of which is incorporated herein in its entirety by reference.

REFERENCE SIGNS LIST 1, 1A to 1D HOME BASE STATION (H(e)NB)
2 MOBILE TERMINAL (UE)
3 HOME NETWORK
4 IP ACCESS NETWORK
5 MOBILE CORE NETWORK
6 EXTERNAL NETWORK
7 RADIO ACCESS NETWORK (UTRAN EUTRAN)
8 LAYER-2 NETWORK (L2-NW)
10 UTRAN/EUTRAN RADIO INTERFACE
11 LAN INTERFACE
12 TRANSFER PROCESSING UNIT
13 CORE NW COMMUNICATION CONTROL UNIT
14 LIPA COMMUNICATION CONTROL UNIT
15 ADDRESS MANAGEMENT UNIT
30 BROADBAND ROUTER
31 HOST
32 DHCP SERVER
33 NETWORK INFORMATION
34 SUBNET (BROADCAST DOMAIN)
35 ROUTER
36 SUBNET (BROADCAST DOMAIN)
37 AUTHENTICATION SERVER
38 EMPLOYEE INFORMATION
39 SERVER
41, 41A to 41D COMMUNICATION PATH (IPsec TUNNEL)
50 HOME BASE STATION GW (H(e)NB-GW)
51 RAN-GW (SGSN/S-GW)
52 EXTERNAL NW-GW(GGSN/P-GW)
53 MOBILITY MANAGEMENT UNIT (MME)
54 SUBSCRIBER MANAGEMENT UNIT (HLR/HSS)
55 SUBSCRIBER INFORMATION

The invention claimed is:

1. A mobile communication system comprising:
a radio access network configured to perform radio communication with a mobile terminal;
a mobile core network connected to the radio access network; and
a gateway device located at a boundary between the radio access network and an external network or at a boundary between the mobile core network and an external network, and having an interface connectable to the external network,
wherein:
the gateway device is configured to store a layer address of the mobile terminal, said Layer-2 address of said mobile terminal being different from the gateway device's Layer-2 address that is assigned to the interface, and to transmit, to the external network through the interface, a transmission Layer-2 data frame having the mobile terminal's Layer-2 address as a source address in response to receiving transmission data to the external network from the mobile terminal,
the mobile core network includes a mobility management unit and a subscriber management unit,
the mobile terminal's Layer-2 is managed by the subscriber management unit in association with a terminal identifier of the mobile terminal,
the gateway device is configured to receive a request containing the terminal identifier from the mobile terminal and transfer the request to the mobility management unit, the request triggering the mobility management unit to initiate an authentication process of the mobile terminal or a location registration process of the mobile terminal,
in response to receiving the request, the mobility management unit is configured to initiate the authentication process or the location registration process, acquire the mobile terminal's Layer-2 address from the subscriber management unit, and send the mobile terminal's Layer-2 address to the gateway device, and
the gateway device is configured to acquire the mobile terminal's Layer-2 address from the subscriber management unit via the mobility management unit during the authentication process or the location registration process.

2. The mobile communication system according to claim 1, wherein the gateway device is further configured to transmit, in response to receiving a received Layer-2 data frame having the mobile terminal's Layer-2 address as a destination address from the external network, data contained in the received Layer-2 data frame to the mobile terminal.

3. The mobile communication system according to claim 2, wherein:
a payload of the transmission Layer-2 data frame contains a Layer-3 data packet having the mobile terminal's Layer-3 address as a source address,
a payload of the received Layer-2 data frame contains a Layer-3 data packet having the mobile terminal's Layer-3 address as a destination address, and
the mobile terminal's Layer-3 address is consistent with a Layer-3 address architecture used in the external network and comprises a Layer-3 address associated with the mobile terminal and different from the gateway device's Layer-3 address.

4. The mobile communication system according to claim 1, wherein the mobile terminal's Layer-2 address comprises an address used in Layer-2 of the external network, not used in Layer-2 of the radio communication.

5. The mobile communication system according to claim 1, wherein the mobile core network supplies the mobile terminal's Layer-2 address to the gateway device on condition that a relationship between the mobile terminal and the gateway device is pre-defined.

6. The mobile communication system according to claim 4, wherein the gateway device is configured to transmit the mobile terminal's Layer-2 address to an address server located in the external network and thereby acquire the mobile terminal's Layer-3 address from the address server.

7. The mobile communication system according to claim 4, wherein the gateway device is configured to generate the mobile terminal's Layer-3 address based on the mobile terminal's Layer-2 address and the Layer-3 address architecture of the external network.

8. The mobile communication system according to claim 4, wherein the gateway device generates the transmission Layer-2 data frame by converting a source address assigned to a Layer-3 data packet included in the transmission data from the mobile terminal to the external network into the mobile terminal's Layer-3 address.

9. The mobile communication system according to claim 1, wherein:
the external network includes a local area network (LAN), and
the gateway device comprises a home base station located in the radio access network and configured to connect to the mobile core network via the LAN.

10. The mobile communication system according to claim 1, wherein the gateway device comprises a home node B gateway (HNB) in Universal Mobile Telecommunications System Terrestrial Radio Access Network (UTRAN) or a home evolved node B gateway (HeNB) in evolved UTRAN (EUTRAN).

11. The mobile communication system according to claim 1, wherein the gateway device comprises a Gateway General Packet Radio Service Support Node (GGSN) in Universal Mobile Telecommunications System Terrestrial Radio Access Network (UTRAN) or Packet Data Network Gateway (P-GW) in evolved UTRAN (EUTRAN) and is located in the mobile core network.

12. The mobile communication system according to claim 1, wherein the terminal identifier comprises an International Mobile Subscriber Identity (IMSI), a Globally Unique Temporary Identity (GUTI), or an International Mobile Equipment Identity (IMEI).

13. A gateway device located at a boundary between a radio access network that performs radio communication with a mobile terminal and an external network or at a boundary between a mobile core network connected to the radio access network and an external network, comprising:
an interface connectable to the external network;
an address management unit configured to store a Layer-2 address of the mobile terminal, said Layer-2 address of said mobile terminal being different from the gateway device's Layer-2 address that is assigned to the interface; and
a communication control unit configured to transmit, to the external network through the interface, a transmission Layer-2 data frame having the mobile terminal's Layer-2 address as a source address in response to receiving transmission data to the external network from the mobile terminal, wherein:
the mobile core network includes a mobility management unit and a subscriber management unit,
the mobile terminal's Layer-2 is managed by the subscriber management unit in association with a terminal identifier of the mobile terminal,
the communication control unit is configured to receive a request containing the terminal identifier from the mobile terminal and transfer the request to the mobility management unit, the request triggering the mobility management unit to initiate an authentication process of the mobile terminal or a location registration process of the mobile terminal, and
the communication control unit is configured to acquire the mobile terminal's Layer-2 address from the subscriber management unit via the mobility management unit during the authentication process or the location registration process.

14. The gateway device according to claim 13, wherein the communication control unit is further configured to transmit, in response to receiving a received Layer-2 data frame having the mobile terminal's Layer-2 address as a destination address from the external network, data contained in the received Layer-2 data frame to the mobile terminal.

15. The gateway device according to claim 13, wherein the mobile terminal's Layer-2 address comprises an address used in Layer-2 of the external network, not used in Layer-2 of the radio communication.

16. The gateway device according to claim 14, wherein:
a payload of the transmission Layer-2 data frame contains a Layer-3 data packet having the mobile terminal's Layer-3 address as a source address,
a payload of the received Layer-2 data frame contains a Layer-3 data packet having the mobile terminal's Layer-3 address as a destination address, and
the mobile terminal's Layer-3 address is consistent with a Layer-3 address architecture used in the external network and comprises a Layer-3 address associated with the mobile terminal and different from the gateway device's Layer-3 address.

17. The gateway device according to claim 16, wherein the address management unit is further configured to transmit the mobile terminal's Layer-2 address to an address server located in the external network through the interface and thereby acquire the mobile terminal's Layer-3 address from the address server.

18. The gateway device according to claim 16, wherein the address management unit is further configured to generate the mobile terminal's Layer-3 address based on the mobile terminal's Layer-2 and the Layer-3 address architecture of the external network.

19. The gateway device according to claim 13, wherein the gateway device comprises a home node B gateway (HNB) in Universal Mobile Telecommunications System Terrestrial Radio Access Network (UTRAN) or a home evolved node B gateway (HeNB) in evolved UTRAN (EUTRAN).

20. The gateway device according to claim 13, wherein the gateway device is Gateway General Packet Radio Service Support Node (GGSN) in Universal Mobile Telecommunications System Terrestrial Radio Access Network (UTRAN) or Packet Data Network Gateway (P-GW) in evolved UTRAN (EUTRAN) and is located in the mobile core network.

21. A base station device configured to connect to a mobile core network via a local area network (LAN) and relay data between the LAN and a mobile terminal and between the mobile core network and the mobile terminal, the base station device comprising:
 a LAN interface capable of sending a Layer-2 data frame to the LAN;
 a radio interface capable of performing radio communication with the mobile terminal;
 a core network communication control unit configured to control data transmission and reception with the mobile core network via the LAN interface;
 a local access communication control unit configured to control communication between the mobile terminal and the LAN not via the mobile core network; and
 an address management unit configured to store a Layer-2 address of the mobile terminal, said Layer-2 address of said mobile terminal being different from the base station device's Layer-2 address that is assigned to the LAN interface, wherein:
 the local access communication control unit is configured to transmit, to the LAN through the LAN interface, a transmission Layer-2 data frame having the mobile terminal's Layer-2 address as a source address in response to receiving transmission data to the LAN from the mobile terminal,
 the mobile core network includes a mobility management unit and a subscriber management unit,
 the mobile terminal's Layer-2 is managed by the subscriber management unit in association with a terminal identifier of the mobile terminal,
 the core network communication control unit is configured to receive a request containing the terminal identifier from the mobile terminal and transfer the request to the mobility management unit, the request triggering the mobility management unit to initiate an authentication process of the mobile terminal or a location registration process of the mobile terminal, and
 the core network communication control unit is configured to acquire the mobile terminal's Layer-2 address from the subscriber management unit via the mobility management unit during the authentication process or the location registration process.

22. The base station device according to claim 21, wherein the local access communication control unit is further configured to transmit, in response to receiving a received Layer-2 data frame having the mobile terminal's Layer-2 address as a destination address through the LAN interface, data contained in the received Layer-2 data frame to the mobile terminal through the radio interface.

23. The base station device according to claim 22, wherein:
 a payload of the transmission Layer-2 data frame contains a Layer-3 data packet having the mobile terminal's Layer-3 address as a source address,
 a payload of the received Layer-2 data frame contains a Layer-3 data packet having the mobile terminal's Layer-3 as a destination address, and
 the mobile terminal's Layer-3 address is consistent with a Layer-3 address architecture used in the LAN and comprises a Layer-3 address associated with the mobile terminal and different from the base station device's Layer-3 address.

24. The base station device according to claim 21, wherein the mobile terminal's Layer-2 address is an address used in Layer-2 of the LAN, not used in Layer-2 of the radio communication.

25. The base station device according to claim 21, wherein the address management unit is further configured to acquire an interface identifier assigned to the mobile terminal and generates the mobile terminal's Layer-2 address based on the interface identifier.

26. The base station device according to claim 24, wherein the address management unit is further configured to transmit the mobile terminal's Layer-2 address to an address server through the LAN interface and thereby acquire the mobile terminal's Layer-3 address from the address server.

27. The base station device according to claim 24, wherein the address management unit is further configured to generate the mobile terminal's Layer-3 address based on the mobile terminal's Layer-2 address and the Layer-3 address architecture of the LAN.

28. The base station device according to claim 24, wherein the local access communication control unit is further configured to generate the transmission Layer-2 data frame by converting a source address assigned to a Layer-3 data packet contained in the transmission data from the mobile terminal to the LAN into the mobile terminal's Layer-3 address.

29. The base station device according to claim 21, wherein the LAN interface transmits, to the LAN, a Layer-2 data frame having a broadcast address or a multicast address as a destination address and having the mobile terminal's Layer-2 address as a source address.

30. A control method of a gateway device, the gateway device located at a boundary between a radio access network that performs radio communication with a mobile terminal and an external network or at a boundary between a mobile core network connected to the radio access network and an external network and including an interface connectable to the external network, the method comprising:
 (a) acquiring a Layer-2 address of the mobile terminal, said Layer-2 address of said mobile terminal being different from the gateway device's Layer-2 address that is assigned to the interface; and
 (b) transmitting, to the external network through the interface, a transmission Layer-2 data frame having the mobile terminal's Layer-2 address as a source address in response to receiving transmission data to the external network from the mobile terminal, wherein:
 the mobile core network includes a mobility management unit and a subscriber management unit,
 the mobile terminal's Layer-2 is managed by the subscriber management unit in association with a terminal identifier of the mobile terminal,
 said acquiring includes receiving a request containing the terminal identifier from the mobile terminal and transferring the request to the mobility management unit, the request triggering the mobility management unit to initiate an authentication process of the mobile terminal or a location registration process of the mobile terminal, and
 said acquiring includes acquiring the mobile terminal's Layer-2 address from the subscriber management unit via the mobility management unit during the authentication process or the location registration process.

31. The control method according to claim 30, further comprising:

(c) in response to receiving a received Layer-2 data frame having the mobile terminal's Layer-2 address as a destination address from the external network, transmitting data contained in the received Layer-2 data frame to the mobile terminal.

32. The control method according to claim 31, wherein:

a payload of the transmission Layer-2 data frame contains a Layer-3 data packet having the mobile terminal's Layer-3 address as a source address, a payload of the received Layer-2 data frame contains a Layer-3 data packet having the mobile terminal's Layer-3 address as a destination address, and the mobile terminal's Layer-3 address is consistent with a Layer-3 address architecture used in the external network and comprises a Layer-3 address associated with the mobile terminal and different from the gateway device's Layer-3 address.

33. A non-transitory computer readable medium storing a program causing a computer to execute control related to a gateway device, the gateway device located at a boundary between a radio access network that performs radio communication with a mobile terminal and an external network or at a boundary between a mobile core network connected to the radio access network and an external network and including a first interface connectable to the external network and a second interface capable of communicating with the mobile terminal, the control comprising:

(a) acquiring the mobile terminal's Layer-2 address different from the gateway device's Layer-2 address that is assigned to the first interface; and (b) controlling the first interface to transmit, to the external network, a transmission Layer-2 data frame having the mobile terminal's Layer-2 address as a source address in response to receiving transmission data to the external network from the mobile terminal, wherein:

the mobile core network includes a mobility management unit and a subscriber management unit, the mobile terminal's Layer-2 is managed by the subscriber management unit in association with a terminal identifier of the mobile terminal, said acquiring includes receiving a request containing the terminal identifier from the mobile terminal and transferring the request to the mobility management unit, the request triggering the mobility management unit to initiate an authentication process of the mobile terminal or a location registration process of the mobile terminal, and said acquiring includes acquiring the mobile terminal's Layer-2 address from subscriber management unit via the mobility management unit during the authentication process or the location registration process.

34. The non-transitory computer readable medium according to claim 33, further comprising:

(c) in response to receiving a received Layer-2 data frame having the mobile terminal's Layer-2 address as a destination address from the external network, controlling the second interface to transmit data contained in the received Layer-2 data frame to the mobile terminal.

35. The non-transitory computer readable medium according to claim 34, wherein:

a payload of the transmission Layer-2 data frame contains a Layer-3 data packet having the mobile terminal's Layer-3 address as a source address, a payload of the received Layer-2 data frame contains a Layer-3 data packet having the mobile terminal's Layer-3 address as a destination address, and the mobile terminal's Layer-3 address is consistent with a Layer-3 address architecture used in the external network and comprises a Layer-3 address associated with the mobile terminal and different from the gateway device's Layer-3 address.

* * * * *